US010092832B2

(12) United States Patent
Oizumi et al.

(10) Patent No.: US 10,092,832 B2
(45) Date of Patent: Oct. 9, 2018

(54) GAME SYSTEM, GAME DEVICE, AND GAME CONTROLLER FOR STORING OPERATION TIMING FOR LATER TRANSMISSION

(71) Applicant: NINTENDO CO., LTD., Kyoto-shi, Kyoto (JP)

(72) Inventors: Toshiki Oizumi, Kyoto (JP); Shumpei Yasuda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/491,207

(22) Filed: Apr. 19, 2017

(65) Prior Publication Data
US 2018/0193740 A1    Jul. 12, 2018

(30) Foreign Application Priority Data

Jan. 6, 2017 (JP) ................................ 2017-001260

(51) Int. Cl.
*A63F 9/24* (2006.01)
*A63F 13/31* (2014.01)
*A63F 13/92* (2014.01)

(52) U.S. Cl.
CPC .............. *A63F 13/31* (2014.09); *A63F 13/92* (2014.09)

(58) Field of Classification Search
CPC ........ A63F 13/22; A63F 13/235; A63F 13/24; A63F 13/42; A63F 2300/1018;
(Continued)

(56) References Cited

U.S. PATENT DOCUMENTS 8,287,373 B2 *  10/2012  Marks ................... G06F 3/017
                                                    345/158
2011/0021271 A1 *  1/2011  Ikeda ................... A63F 13/235
                                                    463/30
(Continued)

FOREIGN PATENT DOCUMENTS

CN     104436646      3/2015
EP     2 853 298      4/2015
(Continued)

OTHER PUBLICATIONS

Wii Operations Manual System Setup, Nintendo of America Inc., 2009, 22 pages.
(Continued)

*Primary Examiner* — Lawrence Galka
(74) *Attorney, Agent, or Firm* — Nixon & Vanderhye PC

(57) ABSTRACT

An example game controller has a memory storing first and second operation times at which the operations onto the first and second operation members have been performed, and a first control circuit. The first control circuit transmits to a main body apparatus, a connection signal. The main body apparatus has a second control circuit. The second control circuit performs processing for establishing connection with the game controller in response to the connection signal, and transmits to the game controller, a request signal when the processing for establishing connection is completed. The first control circuit transmits the information on the operation time stored in the memory to the main body apparatus in response to the request signal. The second control circuit determines whether or not the operations satisfy a predetermined condition based on the operation time, and registers a first operation scheme when a result of determination is affirmative.

10 Claims, 25 Drawing Sheets

(58) Field of Classification Search
CPC ............. A63F 2300/1031; G06F 3/346; G06F 2203/0381; G06F 2203/0382; G06F 2203/0384
See application file for complete search history.

(56) References Cited

U.S. PATENT DOCUMENTS

| | | |
|---|---|---|
| 2011/0256928 A1 | 10/2011 | Dobyns |
| 2012/0295712 A1* | 11/2012 | Nonaka ................. G06F 3/0346 463/37 |
| 2014/0243103 A1* | 8/2014 | Rom ..................... A63F 13/428 463/47 |
| 2014/0340584 A1 | 11/2014 | Sawano et al. |
| 2015/0355768 A1* | 12/2015 | Kuwahara ............. G06F 3/0412 345/157 |
| 2016/0121206 A1 | 5/2016 | Hackney |
| 2016/0361627 A1 | 12/2016 | Fujita et al. |
| 2016/0361632 A1 | 12/2016 | Fujita et al. |
| 2016/0361633 A1 | 12/2016 | Fujita et al. |
| 2016/0361640 A1 | 12/2016 | Iwao et al. |
| 2016/0361641 A1 | 12/2016 | Koizumi et al. |

FOREIGN PATENT DOCUMENTS

| | | |
|---|---|---|
| EP | 3 103 532 | 12/2016 |
| JP | 2004-201728 | 7/2004 |
| JP | 2017-000757 | 1/2017 |

OTHER PUBLICATIONS

Decision to Grant Patent issued in JP Application No. 2017-001260, dated Jul. 24, 2018 (6 pages).

* cited by examiner

FIG.11
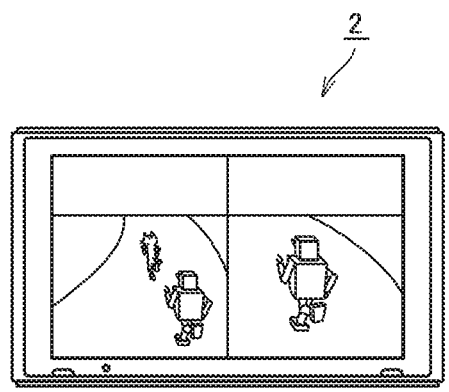
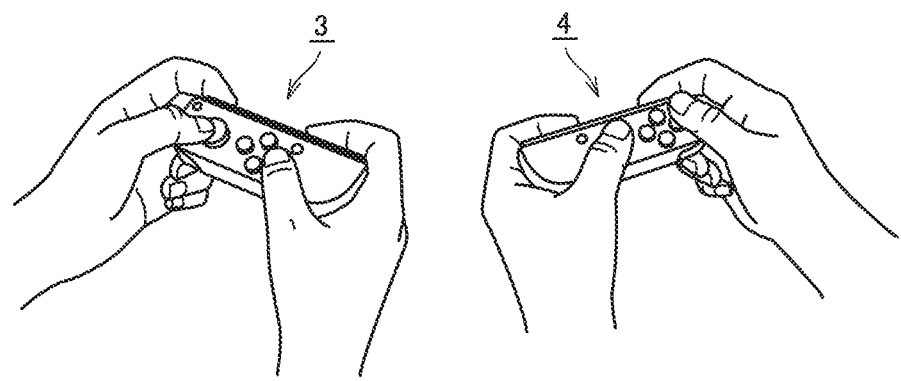

FIG.12
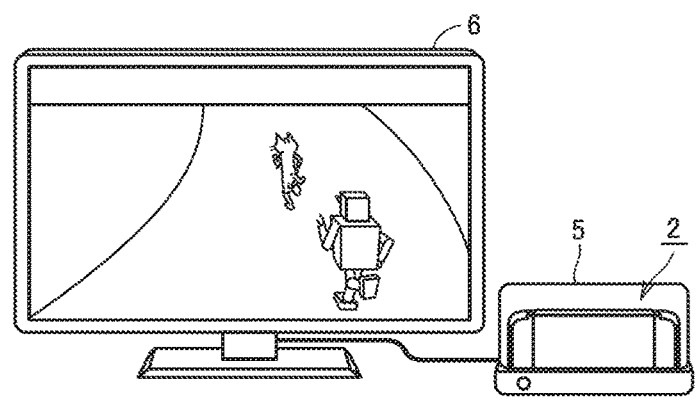
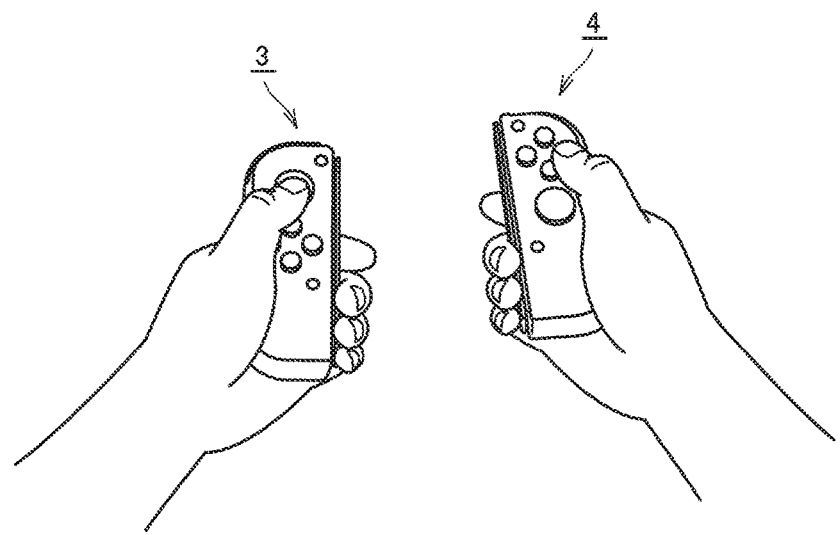

FIG.15

| REGISTRATION INFORMATION |||||
| --- | --- | --- | --- | --- |
| NUMBER INFORMATION | IDENTIFICATION INFORMATION | WIRELESS COMMUNICATION INFORMATION | PLAYER NUMBER | OPERATION SCHEME |
| 1 | ○○○○ | SET | P1 | VERTICAL |
| 2 | × × × × | SET | P1 | VERTICAL |
| 3 | △△△△ | SET | P2 | VERTICAL |
| 4 | ◆◆◆◆ | SET | P2 | VERTICAL |
| ⋮ | ⋮ | ⋮ | ⋮ | ⋮ |

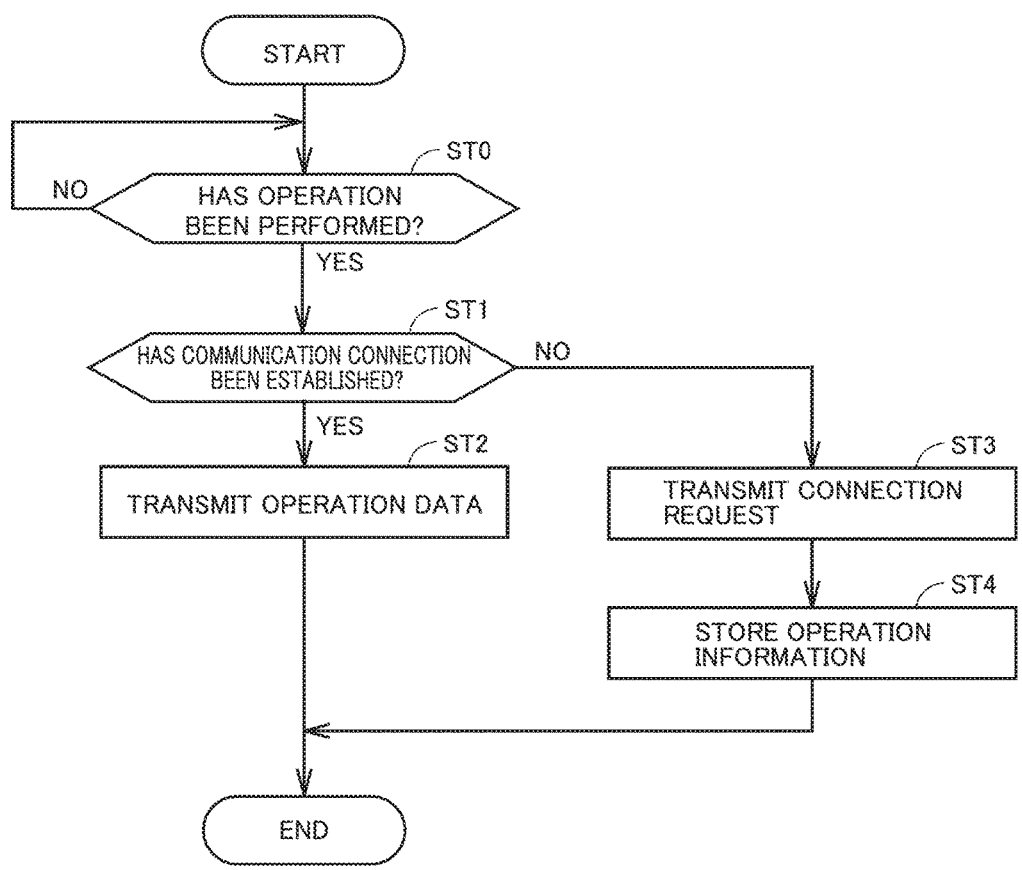

FIG.19A

| ○○:○○ | SECOND L BUTTON |
|---|---|
| ○○:○○ | SECOND R BUTTON |

FIG.19B

| ○○:○○ | FIRST L BUTTON |
|---|---|

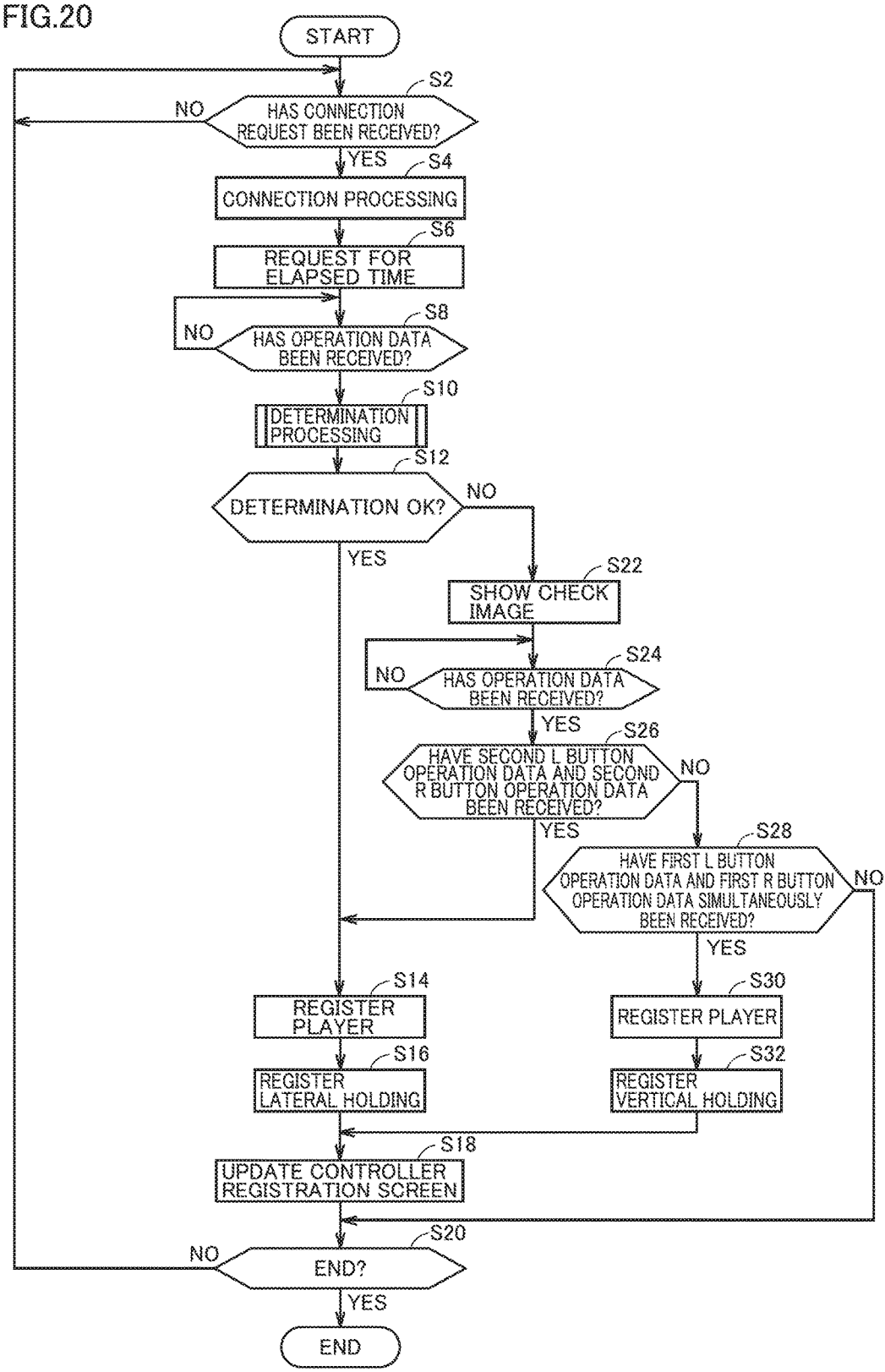

GAME SYSTEM, GAME DEVICE, AND GAME CONTROLLER FOR STORING OPERATION TIMING FOR LATER TRANSMISSION

This nonprovisional application is based on Japanese Patent Application No. 2017-001260 filed with the Japan Patent Office on Jan. 6, 2017, the entire contents of which are hereby incorporated by reference.

FIELD

The present disclosure relates to a game system, a game device, and a game controller, and particularly to processing of an operation of the game controller.

BACKGROUND AND SUMMARY

In a game system representing one example of a conventional information processing system, in registration of a game controller representing an operation apparatus in correspondence with a player number, a scheme for registering a game controller by successively performing the same predetermined operation onto game controllers is available.

In some cases, selection from among a plurality of operation schemes for one game controller can also be made. In such a case, an operation scheme should also be registered, and usability of the game controller is yet to be improved.

The present disclosure aims to solve the problem above, and an object thereof is to provide a game system, a game device, and a game controller allowing improvement in usability.

A game system according to one aspect includes a game controller and a main body apparatus. The game controller has a first operation member, a second operation member, a memory storing a first operation time at which the operation onto the first operation member has been performed and a second operation time at which the operation onto the second operation member has been performed, and a first control circuit. The first control circuit transmits to the main body apparatus, a connection signal in accordance with at least any of an operation onto the first operation member and an operation onto the second operation member. The main body apparatus has a second control circuit. The second control circuit performs processing for establishing connection with the game controller in accordance with the connection signal and transmits to the game controller, a request signal requesting for information on the operation time stored in the memory when the processing for establishing connection is completed. The first control circuit of the game controller transmits to the main body apparatus, the information on the operation time stored in the memory in response to the request signal. The second control circuit of the main body apparatus determines whether or not the operation onto the first operation member and the operation onto the second operation member satisfy a predetermined condition based on the information on the operation time and registers a first operation scheme as an operation scheme of the game controller when a result of determination is affirmative.

By operating once the game controller which has not established connection with the main body apparatus, the processing for establishing connection can be performed and an operation scheme can easily be registered based on information on an operation time. Therefore, usability can be improved.

In the exemplary embodiment, the second control circuit may determine whether or not the operation onto the first operation member and the operation onto the second operation member have been performed substantially simultaneously based on the information on the operation time.

By using the information on the operation time, whether or not the operation onto the first operation member has been performed substantially simultaneously with the operation onto the second operation member can readily be determined.

In the exemplary embodiment, the second control circuit performs game processing based on at least any of a first operation signal in accordance with the operation onto the first operation member and a second operation signal in accordance with the operation onto the second operation member.

Since the first operation member and the second operation member are used also in game processing, it is not necessary to provide a special operation member for registering an operation scheme and then perform an operation, and thus usability can be improved.

In the exemplary embodiment, the second control circuit may register the first operation scheme among a plurality of operation schemes as the operation scheme of the game controller when the result of determination is affirmative.

Since an operation scheme preferred by a user among a plurality of operation schemes can be registered, usability can be improved.

In the exemplary embodiment, the first and second operation members may be on a side of a predetermined operation surface of a housing of the game controller when a user performs an operation.

The first and second operation members are provided on the side of the predetermined operation surface of the housing of the game controller so that an intuitive operation can be performed in selection of an operation scheme and usability can be improved.

In the exemplary embodiment, the second control circuit may register, when a result of determination is negative, the first operation scheme as the operation scheme of the game controller based on a first operation signal in accordance with the operation onto the first operation member and a second operation signal in accordance with the operation onto the second operation member which are subsequently received.

Even when an operation scheme is not registered based on the information on the operation time, the operation scheme can be registered by performing an operation again. Therefore, usability in registration of an operation scheme can be improved.

In the exemplary embodiment, the game controller may further include a third operation member, the first control circuit may transmit to the main body apparatus, a third operation signal in accordance with an operation onto the third operation member, and may register, when a result of determination is negative, a second operation scheme different from the first operation scheme as the operation scheme of the game controller based on a third operation signal which is subsequently received.

Since the second operation scheme different from the first operation scheme can be registered as the operation scheme of the game controller in accordance with an operation of the third operation member, usability can be improved.

A game controller which can communicate with a main body apparatus according to one aspect includes a first operation member, a second operation member, a memory storing a first operation time at which the operation onto the first operation member has been performed and a second operation time at which the operation onto the second operation member has been performed, and a control circuit. The control circuit starts processing for establishing connection with the main body apparatus by transmitting to the main body apparatus, a connection signal in accordance with at least any of an operation onto the first operation member and an operation onto the second operation member, receives a request signal indicating a request for a first elapsed time since the operation onto the first operation member and a second elapsed time since the operation onto the second operation member from the main body apparatus with which the processing for establishing connection has been completed, in order for the main body apparatus to detect simultaneous pressing of the first operation member and the second operation member, and transmits to the main body apparatus, in response to the request signal, the first elapsed time based on a current time and the first operation time stored in the memory and the second elapsed time based on the current time and the second operation time stored in the memory, and transmits to the main body apparatus, a first operation signal in accordance with the operation onto the first operation member and a second operation signal in accordance with the operation onto the second operation member for game processing in the main body apparatus.

By operating once the game controller which has not established connection with the main body apparatus, the processing for establishing connection can be performed and an operation scheme can easily be registered based on information on an operation time. Therefore, usability can be improved.

In the exemplary embodiment, the first and second operation members may be on a side of a predetermined operation surface of a housing of the game controller when a user performs an operation.

The first and second operation members are provided on the side of the predetermined operation surface of the housing of the game controller so that an intuitive operation can be performed in selection of an operation scheme and usability can be improved.

A game system according to another aspect includes a game controller and a main body apparatus. The game controller has a first operation member, a second operation member, a memory storing a first operation time at which an operation onto the first operation member has been performed and a second operation time at which an operation onto the second operation member has been performed when the operation onto the first operation member and the operation onto the second operation member have been performed while connection with the main body apparatus has not been established, and a first control circuit transmitting a connection signal for connection with the main body apparatus to the main body apparatus while connection with the main body apparatus has not been established. The main body apparatus has a second control circuit. The second control circuit performs processing for establishing connection with the game controller in accordance with the connection signal, and transmits to the game controller, a request signal requesting for information on the operation time stored in the memory when the processing for establishing connection is completed. The first control circuit of the game controller transmits to the main body apparatus, the information on the operation time stored in the memory in response to the request signal. The second control circuit of the main body apparatus determines whether or not the operation onto the first operation member and the operation onto the second operation member satisfy a predetermined condition based on the information on the operation time and registers a first operation scheme as an operation scheme of the game controller when a result of determination is affirmative.

By operating once the game controller which has not established connection with the main body apparatus, the processing for establishing connection can be performed and an operation scheme can easily be registered based on information on an operation time. Therefore, usability can be improved.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is an example non-limiting diagram showing one example of a manner of use of game device 1 with two users each holding one controller in a detached state.

FIG. 12 is an example non-limiting diagram showing one example of a manner of use of game device 1 with main body apparatus 2 being attached to a cradle 5.

FIG. 15 is an example non-limiting diagram illustrating one example of registration information based on the embodiment.

FIG. 17 is an example non-limiting flowchart illustrating transmission of operation data of left controller 3 based on the embodiment.

FIGS. 19A and 19B are example non-limiting diagrams illustrating operation information stored in a memory 102 based on the embodiment.

FIG. 20 is an example non-limiting flowchart illustrating one example of a flow of processing for registration of a controller with which communication connection has not been established, the processing being performed in main body apparatus 2 based on the embodiment.

DETAILED DESCRIPTION OF NON-LIMITING EXAMPLE EMBODIMENTS

Figure 1:
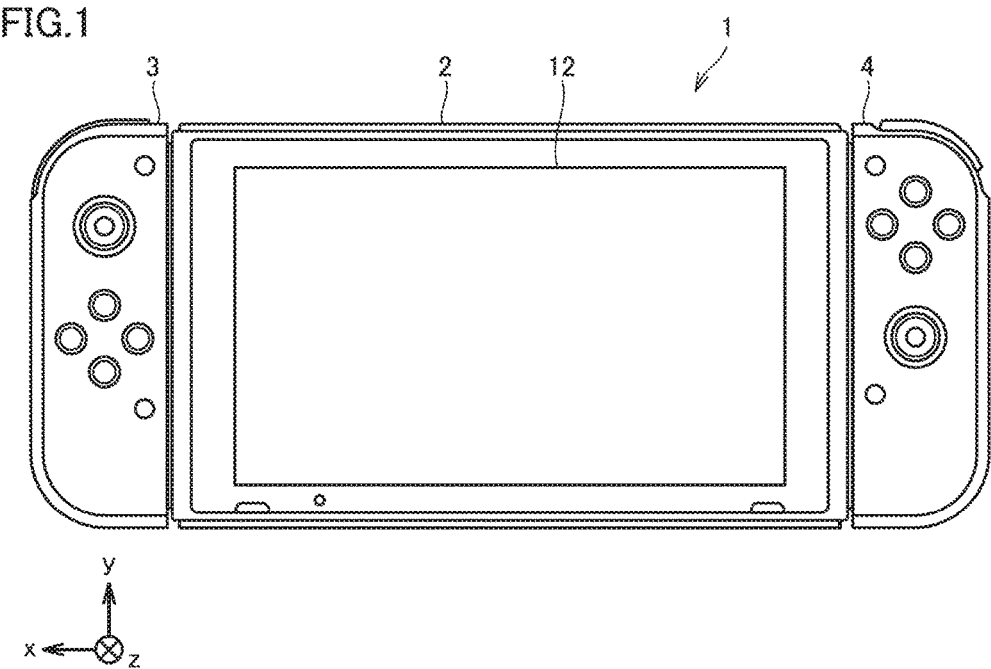
FIG. 1 is an example non-limiting schematic diagram showing appearance of a game device 1 according to the present embodiment.

This embodiment will be described in detail with reference to the drawings. The same or corresponding elements in the drawings have the same reference characters allotted and description thereof will not be repeated.

[A. Information Processing System]

An apparatus configuration relating to an information processing system based on the present embodiment will be described. The information processing system according to the present embodiment is configured at least with an information processing apparatus described below.

For example, an information processing apparatus may be a portable (also referred to as mobile) device such as a portable game device, a portable telephone, or a smartphone, a stationary apparatus such as a personal computer or a home game console, or a large apparatus such as an arcade game machine. In the present example, a game device representing one example of an information processing apparatus will be described by way of example. Though a game controller provided for a game device will be described in the present example by way of example of an operation apparatus, limitation in particular to a game controller is not intended and any operation apparatus may be applicable so long as it functions as an input device capable of transmitting operation data to an information processing apparatus.

(a1: Overall Configuration of Game Device)

FIG. 1 is an example non-limiting schematic diagram showing appearance of a game device 1 according to the present embodiment.

As shown in FIG. 1, game device 1 includes a main body apparatus 2, a left controller 3, and a right controller 4. Main body apparatus 2 includes a display 12 representing one example of a display portion and performs various types of processing including game processing in game device 1.

Figure 2:
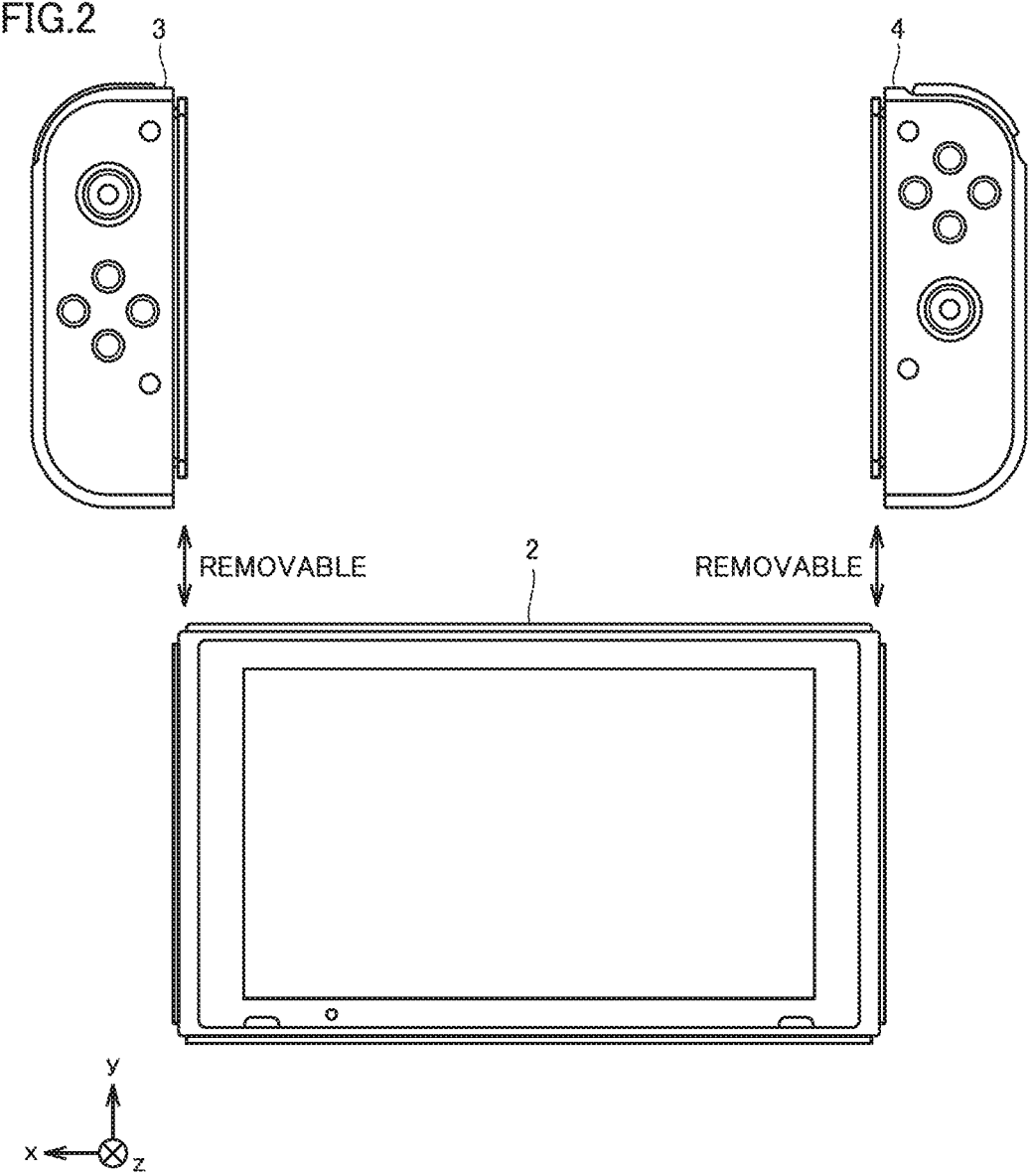
FIG. 2 is an example non-limiting schematic diagram showing appearance of another manner of game device 1 according to the present embodiment.

FIG. 2 is an example non-limiting schematic diagram showing appearance of another manner of game device 1 according to the present embodiment.

As shown in FIG. 2, left controller 3 and right controller 4 may be constructed as being detachable from main body apparatus 2. Left controller 3 and right controller 4 may integrally be constructed or left controller 3 and right controller 4 may be constructed as separate apparatuses. Thus, left controller 3 and right controller 4 corresponding to an operation portion may be constructed separately from main body apparatus 2.

Left controller 3 can be attached to a left side (a side of a positive direction of an x axis shown in FIG. 1) of main body apparatus 2. Right controller 4 can be attached to a right side (a side of a negative direction of the x axis shown in FIG. 1) of main body apparatus 2. In the description below, left controller 3 and right controller 4 may collectively be referred to as a "controller". A more specific configuration example of main body apparatus 2, left controller 3, and right controller 4 will be described below.

(a2: Structure of Main Body Apparatus)

Figure 3:
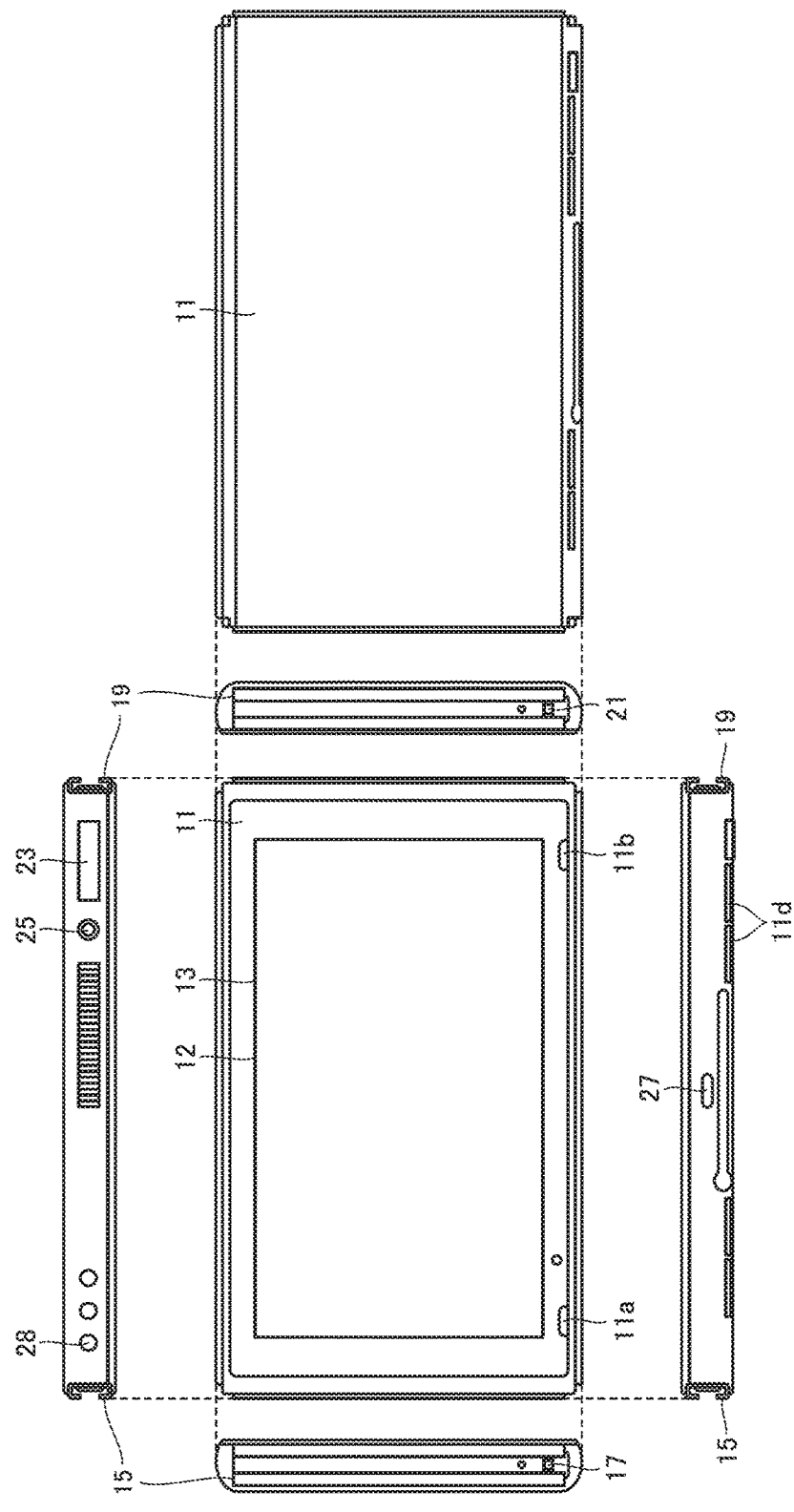
FIG. 3 is an example non-limiting diagram of a main body apparatus 2 according to the present embodiment when viewed from six sides.

FIG. 3 is an example non-limiting diagram of main body apparatus 2 according to the present embodiment when viewed from six sides.

Referring to FIG. 3, main body apparatus 2 has a housing 11 substantially in a form of a plate.

A main surface of housing 11 (that is, a front surface or a surface where display 12 is provided) is substantially in a rectangular shape.

A shape and a size of housing 11 can arbitrarily be designed.

(1) Member Provided on Main Surface of Housing 11

As shown in FIGS. 1 to 3, display 12 is provided on the main surface of housing 11 of main body apparatus 2. Display 12 shows an image obtained or generated by main body apparatus 2 (which may be a still image or moving images). When game processing is performed, display 12 shows a virtual space and an object in the virtual space. Though display 12 is typically implemented by a liquid crystal display (LCD), a display apparatus of any type can be adopted.

A touch panel 13 is provided on a screen of display 12. Typically, a device of a type accepting a multi-touch input (for example, a capacitance type) is adopted as touch panel 13. For example, a device of any type such as a device of a type accepting a single-touch input (for example, a resistive film type) can be adopted as touch panel 13.

Speaker holes 11a and 11b are provided in the main surface of housing 11 of main body apparatus 2 and sound generated from a speaker (a speaker 88 shown in FIG. 7) arranged in housing 11 is output through speaker holes 11a and 11b.

Two speakers are provided in main body apparatus 2 and speaker holes 11a and 11b are provided in correspondence with respective positions of a left speaker and a right speaker. Speaker hole 11a is provided on a left side of display 12 in correspondence with the left speaker and speaker hole 11b is provided on a right side of display 12 in correspondence with the right speaker.

(2) Member Provided on Left Side Surface of Housing 11

A left rail member 15 for removably attaching left controller 3 to main body apparatus 2 is provided in a left side surface of housing 11. Left rail member 15 extends along an up-down direction in the left side surface of housing 11. Left rail member 15 is in a shape allowing engagement thereof with a slider (a slider 40 shown in FIG. 4) for left controller 3. A slide mechanism is formed by left rail member 15 and slider 40. With such a slide mechanism, left controller 3 can slidably and removably be attached to main body apparatus 2.

A left terminal 17 is provided in the left side surface of housing 11. Left terminal 17 is a terminal for wired communication between main body apparatus 2 and left controller 3. Left terminal 17 is provided at a position where it comes in contact with a terminal (a terminal 42 shown in FIG. 4) of left controller 3 when left controller 3 is attached to main body apparatus 2. Left terminal 17 should be arranged at any position where the left terminal of main body apparatus 2 and the terminal of left controller 3 are in contact with each other while left controller 3 is attached to main body apparatus 2. By way of example, as shown in FIG. 3, left terminal 17 is provided around a lower end portion of left rail member 15.

(3) Member Provided in Right Side Surface of Housing 11

As shown in FIG. 3, a feature similar to the feature provided in the left side surface is provided in a right side surface of housing 11. A right rail member 19 for removably attaching right controller 4 to main body apparatus 2 is provided in the right side surface of housing 11. Right rail member 19 extends along the up-down direction in the right side surface of housing 11. Right rail member 19 is in a shape allowing engagement thereof with a slider (a slider 62 shown in FIG. 5) for right controller 4. A slide mechanism is formed by right rail member 19 and slider 62. With such a slide mechanism, right controller 4 can slidably and removably be attached to main body apparatus 2.

Right rail member 19 is in a shape similar to left rail member 15. Right rail member 19 is in a grooved shape similar in cross-sectional shape to left rail member 15. Right rail member 19 does not have to be exactly the same in shape as left rail member 15. For example, another embodiment may be constructed such that slider 62 for right controller 4 cannot be engaged with left rail member 15 and/or slider 40 for left controller 3 cannot be engaged with right rail member 19 by making a size and/or a shape of the groove different between left rail member 15 and right rail member 19.

A right terminal 21 is provided in the right side surface of housing 11. Right terminal 21 is a terminal for wired communication between main body apparatus 2 and right controller 4. Right terminal 21 is provided at a position where it comes in contact with a terminal (a terminal 64 shown in FIG. 5) of right controller 4 when right controller 4 is attached to main body apparatus 2. Right terminal 21 should be arranged at any position where the right terminal of main body apparatus 2 and the terminal of right controller 4 are in contact with each other while right controller 4 is attached to main body apparatus 2. By way of example, as shown in FIG. 3, right terminal 21 is provided around a lower end portion of right rail member 19.

(4) Member Provided on Upper Side Surface of Housing 11

As shown in FIG. 3, a first slot 23 for attaching a storage medium of a first type is provided in an upper side surface of housing 11. A lid portion which can be opened and closed is provided in an opening in first slot 23 as a typical feature, and a storage medium of the first type can be inserted in first slot 23 while the lid portion is open. The storage medium of the first type is, for example, a storage medium exclusively designed for game device 1 and a game device of the same type (for example, a dedicated memory card). The storage medium of the first type is used, for example, for storing data used in main body apparatus 2 (for example, data saved for an application) and/or a program executed in main body apparatus 2 (for example, a program for an application).

A power button 28 for switching on and off main body apparatus 2 is provided on the upper side surface of housing 11.

An audio input and output terminal 25 (specifically an earphone jack) is provided in the upper side surface of housing 11. A microphone or an earphone can be attached to audio input and output terminal 25.

(5) Member Provided on Lower Side Surface of Housing 11

As shown in FIG. 3, a lower terminal 27 for wired communication between main body apparatus 2 and a cradle 5 which will be described later is provided in a lower side surface of housing 11. Lower terminal 27 is provided at a position where it comes in contact with a terminal of cradle 5 when main body apparatus 2 is attached to cradle 5. Typically, a universal serial bus (USB) connector (more specifically, a female connector) can be adopted as lower terminal 27.

A position, a shape, and the number of components (specifically, a button, a slot, and a terminal) provided in housing 11 described above can arbitrarily be designed. For example, in another embodiment, power button 28 or first slot 23 may be provided in another side surface or a rear surface of housing 11. Some of the components do not have to be provided.

(a3: Structure of Left Controller)

Figure 4:
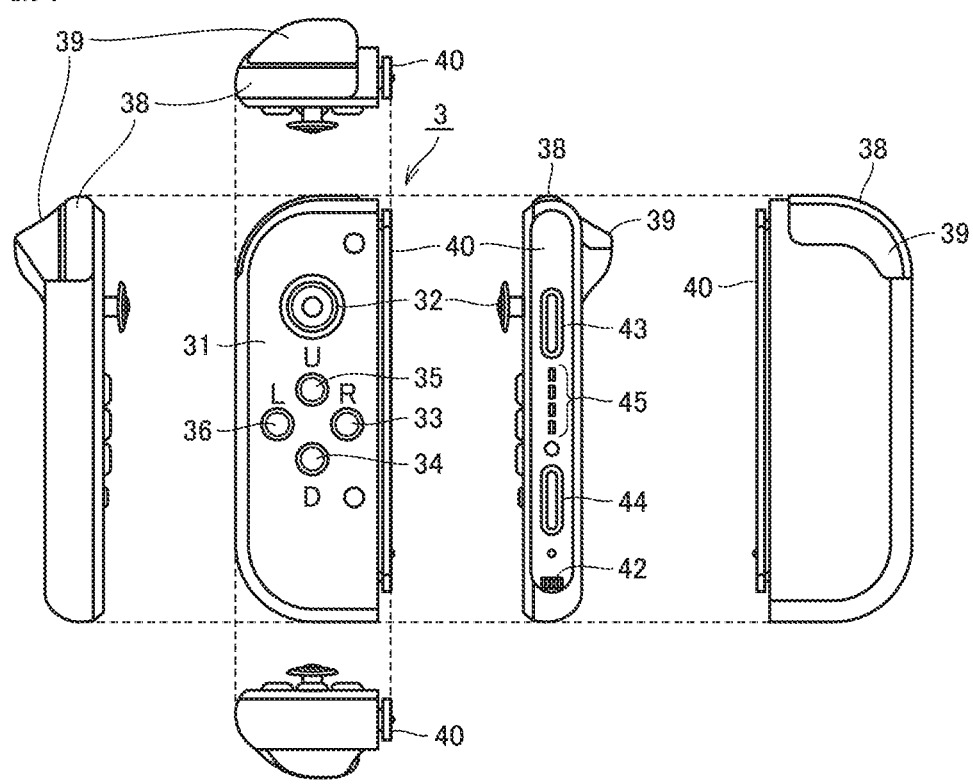
FIG. 4 is an example non-limiting diagram of a left controller 3 according to the present embodiment when viewed from six sides.

FIG. 4 is an example non-limiting diagram of left controller 3 according to the present embodiment when viewed from six sides.

Referring to FIG. 4, left controller 3 has a housing 31 substantially in a form of a plate. A main surface of housing 31 (that is, a front surface or a surface on a side of a negative direction of a z axis shown in FIG. 1) is substantially in a rectangular shape. Housing 31 is in a vertically long shape, that is, long in the up-down direction (that is, a direction of a y axis shown in FIG. 1).

Left controller 3 can be used with its main surface being vertically oriented or with its surface being horizontally oriented when a user holds the left controller while the left controller is detached from main body apparatus 2.

A shape and a size of housing 31 can arbitrarily be designed. In another embodiment, housing 31 may be constructed into a shape other than a shape substantially in a form of a plate. Housing 31 does not have to be rectangular, and for example, a semicircular shape may be adopted. Housing 31 does not have to vertically be long.

A length of housing 31 in the up-down direction is preferably substantially the same as a length in the up-down direction of housing 11 of main body apparatus 2. A thickness of housing 31 (that is, a length in a front-rear direction or a length in the direction of the z axis shown in FIG. 1) is preferably substantially the same as a thickness of housing 11 of main body apparatus 2. Therefore, when left controller 3 is attached to main body apparatus 2 (see FIG. 1), a user can hold main body apparatus 2 and left controller 3 as if they were an integrated apparatus.

A left corner portion of the main surface of housing 31 is rounded more than a right corner portion. A portion of connection between an upper side surface and a left side surface of housing 31 and a portion of connection between a lower side surface and the left side surface of housing 31 are rounded more than a portion of connection between the upper side surface and a right side surface and a portion of connection between the lower side surface and the right side surface (that is, a curve of beveling is great). Therefore, when left controller 3 is attached to main body apparatus 2 (see FIG. 1), the left side of game device 1 is rounded and hence such a shape facilitates holding by a user.

An analog stick 32 is provided in left controller 3. As shown in FIG. 4, analog stick 32 is provided on the main surface of housing 31. Analog stick 32 represents one example of a direction instruction portion with which a direction can be input. Analog stick 32 includes a stick member which can be tilted in all directions (that is, a 360° direction including up, down, left, right, and diagonal directions) in parallel to the main surface of housing 31. The analog stick is an analog input device with which a user can input a direction in accordance with a direction of tilt by titling the stick member. Analog stick 32 may further be constructed to be able to give an input of magnitude in accordance with an angle of tilt in addition to input of a direction in accordance with a direction of tilt when the stick member is tilted. Alternatively, a slide stick may implement the direction instruction portion. The slide stick is an input portion having a stick member slidable in all directions in parallel to the main surface of housing 31, and the user can give an input in accordance with a direction of slide by sliding the stick member. The slide stick may further be constructed also to give an input of magnitude in accordance with an amount of slide. Alternatively, the direction instruction portion may be implemented as an input portion indicating a direction through an operation to press a button. For example, the direction instruction portion may be implemented as an input portion indicating a direction with a cross-shaped key or four buttons corresponding to up, down, left, and right directions, respectively. In the present embodiment, an input can be given by pressing the stick member (in the direction perpendicular to housing 31). Analog stick 32 in the present embodiment is an input portion with which an input of a direction and magnitude in accordance with a direction of tilt and an amount of tilt of the stick member can be given and an input resulting from pressing of the stick member can be given.

Left controller 3 includes four operation buttons 33 to 36 (specifically, a right direction button 33, a down direction button 34, an up direction button 35, and a left direction button 36). As shown in FIG. 4, these four buttons 33 to 36 are provided under analog stick 32 on the main surface of housing 31. Though four operation buttons are provided on the main surface of left controller 3 in the present embodiment, any number of operation buttons may be provided. These operation buttons 33 to 36 are used for giving an instruction in accordance with various programs (for example, an OS program or an application program) executed in main body apparatus 2. Since operation buttons 33 to 36 may be used for giving an input of a direction in the present embodiment, operation buttons 33 to 36 are also referred to as right direction button 33, down direction button 34, up direction button 35, and left direction button 36 for the sake of convenience of description. Operation buttons 33 to 36 may be used for giving an instruction other than an input of a direction.

Figure 9:
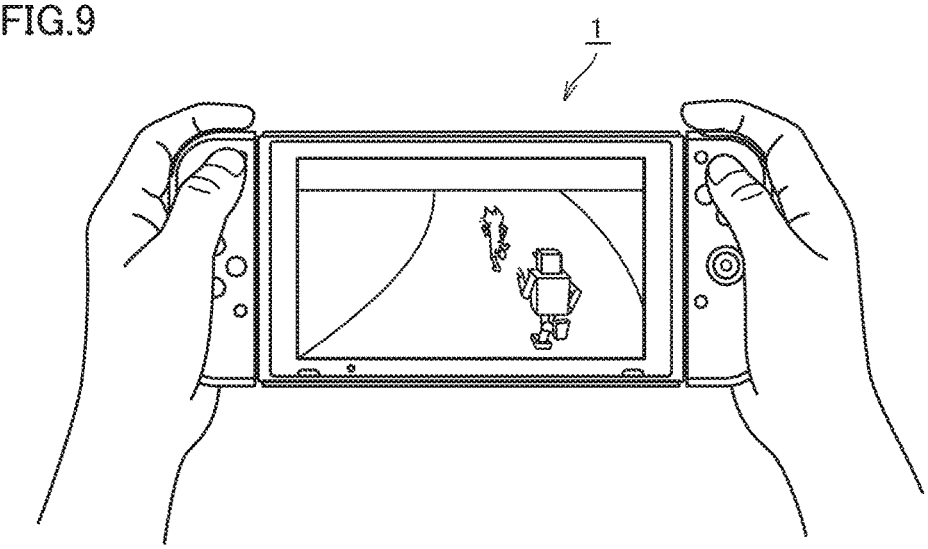
FIG. 9 is an example non-limiting diagram showing one example of a manner of use of game device 1 with left controller 3 and right controller 4 being attached to main body apparatus 2.

An operation portion (specifically, analog stick 32 and operation buttons 33 to 36) provided on the main surface of left controller 3 is operated, for example, with the left thumb of a user who holds game device 1 when left controller 3 is attached to main body apparatus 2 (see FIG. 9). When left controller 3 is used as being detached from main body apparatus 2, the operation portion is operated, for example, with the left thumb of the user who holds left controller 3 (see FIG. 10).

A first L button 38 and a ZL button 39 are provided in left controller 3. These operation buttons 38 and 39 are used for giving an instruction in accordance with various programs executed in main body apparatus 2, similarly to operation buttons 33 to 36 described above. As shown in FIG. 4, first L button 38 is provided in an upper left portion on the side surface of housing 31. ZL button 39 is provided in an upper left portion as extending from the side surface to the rear surface of housing 31 (strictly speaking, the upper left portion when housing 31 is viewed from the front). ZL button 39 is provided in the rear of first L button 38 (a side of a positive direction of the z axis shown in FIG. 1). Since the upper left portion of housing 31 is rounded in the present embodiment, first L button 38 and ZL button 39 are in a rounded shape in conformity with rounding of the upper left portion of housing 31.

When left controller 3 is attached to main body apparatus 2, first L button 38 and ZL button 39 are arranged in the upper left portion of game device 1 (see FIG. 1). Therefore, a user who holds game device 1 can operate first L button 38 and ZL button 39 with his/her left forefinger or long finger.

Left controller 3 has slider 40 described above. As shown in FIG. 4, slider 40 extends along the up-down direction in the right side surface of housing 31. Slider 40 is in a shape allowing engagement with left rail member 15 (more specifically, a groove in left rail member 15) of main body apparatus 2. Specifically, slider 40 has a projecting cross-section (specifically, a cross-section perpendicular to the up-down direction). More specifically, slider 40 has a cross-section in a T shape in conformity with a shape of a cross-section of left rail member 15. Therefore, slider 40 engaged with left rail member 15 is fixed and does not come off in a direction perpendicular to a direction of slide (that is, a direction of extension of left rail member 15).

Left controller 3 includes a second L button 43 and a second R button 44. These buttons 43 and 44 are used for giving an instruction in accordance with various programs executed in main body apparatus 2 similarly to other operation buttons 33 to 36. As shown in FIG. 4, second L button 43 and second R button 44 are provided in the surface where slider 40 is attached. Second L button 43 is provided above the center in terms of the up-down direction (the direction of they axis shown in FIG. 1) on the surface where slider 40 is attached. Second R button 44 is provided under the center in terms of the up-down direction on the surface where slider 40 is attached. Second L button 43 and second R button 44 are arranged at positions where they cannot be pressed while left controller 3 is attached to main body apparatus 2. Second L button 43 and second R button 44 are used while left controller 3 is detached from main body apparatus 2. Second L button 43 and second R button 44 are operated, for example, with a forefinger or a long finger of left and right hands of a user who holds left controller 3 detached from main body apparatus 2.

In the present embodiment, a button (specifically, second L button 43 and second R button 44) provided on the surface where slider 40 is attached is provided not to protrude from that surface. An upper surface of the button (in other words, a surface which is pressed) is arranged flush with the surface where slider 40 is attached or at a position lower than such a surface. Thus, while slider 40 is attached to left rail member 15 of main body apparatus 2, slider 40 can smoothly be slid with respect to left rail member 15.

(a4: Structure of Right Controller)

Figure 5:
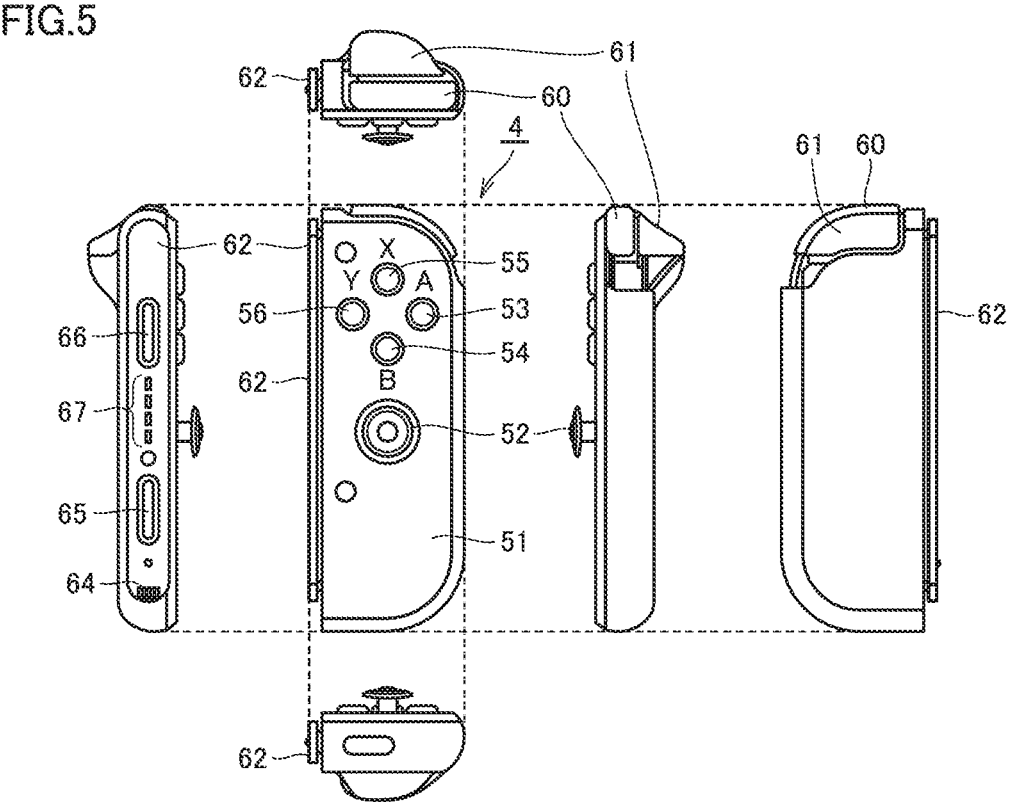
FIG. 5 is an example non-limiting diagram of a right controller 4 according to the present embodiment when viewed from six sides.

FIG. 5 is an example non-limiting diagram of right controller 4 according to the present embodiment when viewed from six sides.

Referring to FIG. 5, right controller 4 has a housing 51 substantially in a form of a plate. A main surface of housing 51 (that is, a front surface or a surface on the side of the negative direction of the z axis shown in FIG. 1) is substantially in a rectangular shape. Housing 51 is in a vertically long shape, that is, long in the up-down direction.

Right controller 4 can be used with its main surface being vertically oriented or with its surface being horizontally oriented when a user holds the right controller while the right controller is detached from main body apparatus 2.

Similarly to housing 31 of left controller 3, a length of housing 51 of right controller 4 in the up-down direction is preferably substantially the same as the length in the up-down direction of housing 11 of main body apparatus 2 and a thickness thereof is preferably substantially the same as the thickness of housing 11 of main body apparatus 2. Therefore, when right controller 4 is attached to main body apparatus 2 (see FIG. 1), a user can hold main body apparatus 2 and right controller 4 as if they were an integrated apparatus.

A right corner portion of the main surface of housing 51 is rounded more than a left corner portion. A portion of connection between an upper side surface and a right side surface of housing 51 and a portion of connection between a lower side surface and the right side surface of housing 51 are rounded more than a portion of connection between the upper side surface and a left side surface and a portion of connection between the lower side surface and the left side surface (that is, a curve of beveling is great). Therefore, when right controller 4 is attached to main body apparatus 2 (see FIG. 1), the right side of game device 1 is rounded and hence such a shape facilitates holding by a user.

An analog stick 52 is provided in right controller 4 as a direction instruction portion as in left controller 3. Analog stick 52 is constructed substantially similarly to analog stick 32 in left controller 3. Right controller 4 includes four operation buttons 53 to 56 (specifically, an A button 53, a B button 54, an X button 55, and a Y button 56) similarly to left controller 3. These four operation buttons 53 to 56 are substantially the same in mechanism as four operation buttons 33 to 36 in left controller 3. As shown in FIG. 5, analog stick 52 and operation buttons 53 to 56 are provided on the main surface of housing 51. Though four operation buttons are provided on the main surface of right controller 4 in the present embodiment, any number of operation buttons may be provided.

Positional relation between two types of operation portions (analog stick 52 and the operation buttons) in right controller 4 is opposite to positional relation of these two types of operation portions in left controller 3. In right controller 4, analog stick 52 is arranged under operation buttons 53 to 56, whereas in left controller 3, analog stick 32 is arranged above operation buttons 33 to 36. With such arrangement, when two controllers are used as being detached from main body apparatus 2, both of the controllers can be used with similar operational feeling.

When right controller 4 is attached to main body apparatus 2, the operation portion (specifically analog stick 52 and operation buttons 53 to 56) provided on the main surface of right controller 4 is operated, for example, with the right thumb of a user who holds game device 1. When right controller 4 is used as being detached from main body apparatus 2, the operation portion is operated, for example, with the right thumb of a user who holds right controller 4.

A first R button 60 and a ZR button 61 are provided in right controller 4. As shown in FIG. 5, first R button 60 is provided in an upper right portion on the side surface of housing 51. ZR button 61 is provided in an upper right portion as extending from the side surface to the rear surface of housing 51 (strictly speaking, the upper right portion when housing 51 is viewed from the front). ZR button 61 is provided in the rear of first R button 60 (the side of the positive direction of the z axis shown in FIG. 1). Since the upper right portion of housing 51 is rounded in the present embodiment, first R button 60 and ZR button 61 are in a rounded shape in conformity with rounding of the upper right portion of housing 51.

When right controller 4 is attached to main body apparatus 2, first R button 60 and ZR button 61 are arranged in the upper right portion of game device 1 (see FIG. 1). Therefore, a user who holds game device 1 can operate first R button 60 and ZR button 61 with his/her right forefinger or long finger.

In the present embodiment, first L button 38 and first R button 60 are not symmetric to each other in shape, and ZL button 39 and ZR button 61 are not symmetric to each other in shape. In another embodiment, first L button 38 and first R button 60 may be symmetric to each other in shape, and ZL button 39 and ZR button 61 may be symmetric to each other in shape.

Right controller 4 has terminal 64 for wired communication between right controller 4 and main body apparatus 2. Terminal 64 is provided at a position where it comes in contact with right terminal 21 (FIG. 3) of main body apparatus 2 when right controller 4 is attached to main body apparatus 2. Terminal 64 should be arranged at any position where main body apparatus 2 and right controller 4 are in contact with each other while right controller 4 is attached to main body apparatus 2. By way of example, as shown in FIG. 5, terminal 64 is provided around a lower end portion of the surface where slider 62 is attached.

A position, a shape, and the number of components (specifically, a slider, a stick, a button, and an LED) provided in housing 31 of left controller 3 and/or housing 51 of right controller 4 can arbitrarily be designed. For example, in another embodiment, the controller may include a direction instruction portion of a type different from the analog stick. Slider 40 or 62 may be arranged at a position in accordance with a position of left rail member 15 and right rail member 19 provided in main body apparatus 2, and for example, may be arranged in the main surface or the rear surface of housing 31 or 51. Some of the components do not have to be provided.

Right controller 4 includes a second L button 65 and a second R button 66 as in left controller 3. These buttons 65 and 66 are used for giving an instruction in accordance with various programs executed in main body apparatus 2 similarly to other operation buttons 53 to 56. As shown in FIG. 5, second L button 65 and second R button 66 are provided on a surface where slider 62 is attached. Second L button 65 is provided under the center in terms of the up-down direction (the direction of they axis shown in FIG. 1) on the surface where slider 62 is attached. Second R button 66 is provided above the center in terms of the up-down direction on the surface where slider 62 is attached. Second L button 65 and second R button 66 are arranged at positions where they cannot be pressed while right controller 4 is attached to main body apparatus 2. Second L button 65 and second R button 66 are used while right controller 4 is detached from main body apparatus 2. Second L button 65 and second R button 66 are operated, for example, with a forefinger or a long finger of left and right hands of a user who holds right controller 4 detached from main body apparatus 2.

In the present embodiment, also in right controller 4 as in left controller 3, a button (specifically, second L button 65 and second R button 66) provided on the surface where slider 62 is attached is provided not to protrude from that surface. An upper surface of the button (in other words, a surface which is pressed) is arranged flush with the surface where slider 62 is attached or at a position lower than such a surface. Thus, while slider 62 is attached to right rail member 19 of main body apparatus 2, slider 62 can smoothly be slid with respect to right rail member 19.

(a5: Use of Cradle)

Figure 6:
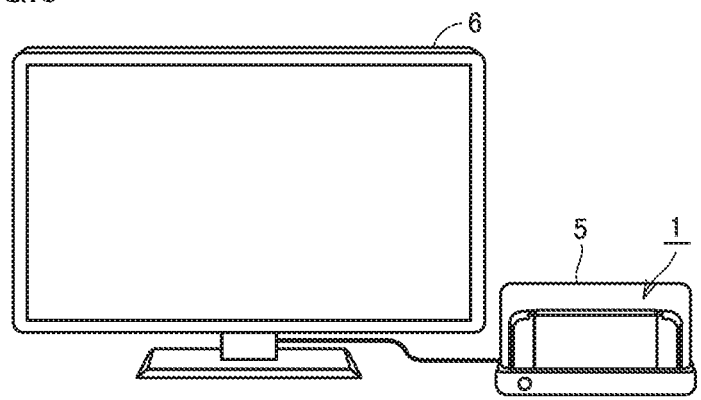
FIG. 6 is an example non-limiting schematic diagram showing appearance when game device 1 according to the present embodiment is used together with a cradle.

FIG. 6 is an example non-limiting schematic diagram showing appearance when game device 1 according to the present embodiment is used together with a cradle. A game system shown in FIG. 6 includes game device 1 and cradle 5.

Cradle 5 is constructed to be able to carry game device 1 and constructed to be able to communicate with a television 6 representing one example of an external display apparatus separate from display 12 of game device 1. When game device 1 is carried on cradle 5, an image obtained or generated by game device 1 can be shown on television 6. Communication between cradle 5 and television 6 may be wired communication or wireless communication.

Cradle 5 may have a function to charge placed game device 1 and a function as a communication hub apparatus (for example, a USB hub).

[B. Internal Configuration of Each Apparatus]

An internal configuration of each apparatus associated with the information processing system based on the present embodiment will initially be described.

(b1: Internal Configuration of Main Body Apparatus)

Figure 7:
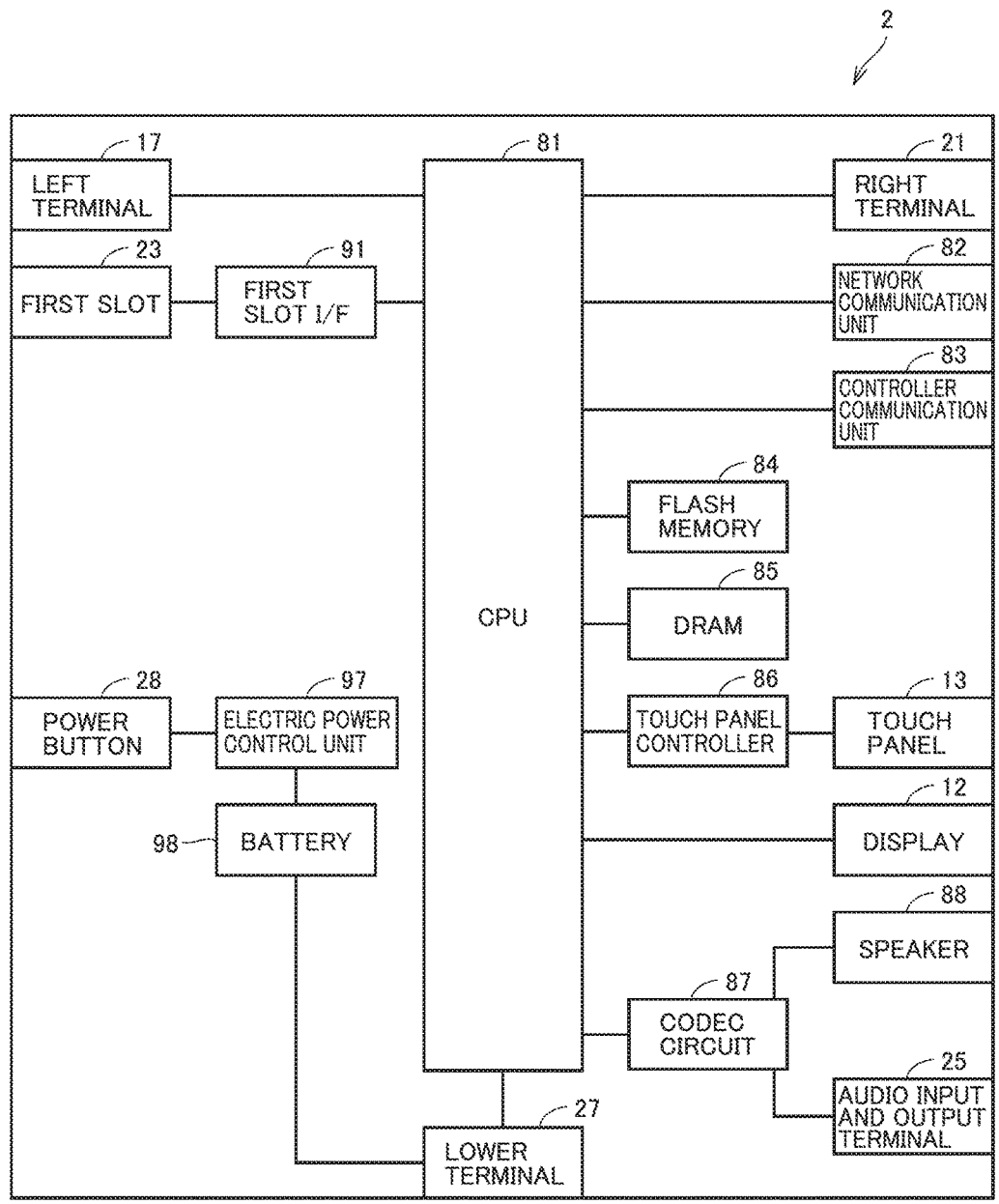
FIG. 7 is an example non-limiting block diagram showing an internal configuration of main body apparatus 2 according to the present embodiment.

FIG. 7 is an example non-limiting block diagram showing an internal configuration of main body apparatus 2 according to the present embodiment.

Main body apparatus 2 includes components shown in FIG. 7. The components shown in FIG. 7 are accommodated in housing 11, for example, as being mounted on an electronic circuit substrate as electronic components.

Main body apparatus 2 includes a central processing unit (CPU) 81 corresponding to an information processing unit (or a processor) performing various types of processing including game processing. CPU 81 reads and executes a program stored in an accessible memory (specifically, an internal storage medium such as a flash memory 84 or an external storage medium attached to first slot 23).

Main body apparatus 2 includes flash memory 84 and a dynamic random access memory (DRAM) 85 by way of example of an embedded internal storage medium. Flash memory 84 is a non-volatile memory mainly storing various types of data (which may be a program) saved in main body apparatus 2. DRAM 85 is a volatile memory temporarily storing various types of data used in information processing.

Main body apparatus 2 includes a first slot interface (I/F) 91. The first slot interface is connected to first slot 23 and reads and writes data from and into a storage medium of the first type (for example, an SD card) attached to first slot 23, in response to an instruction from CPU 81.

Main body apparatus 2 includes a network communication unit 82 for communication (specifically, wireless communication) with an external apparatus through a network. For example, a communication module authorized for Wi-Fi is employed for network communication unit 82 and network communication unit 82 communicates with an external apparatus through wireless LAN. In another embodiment, main body apparatus 2 may have a function for connection and communication with a mobile communication network (that is, a portable telephone communication network) in addition to (or instead of) a function for connection and communication with wireless LAN.

Main body apparatus 2 includes a controller communication unit 83 for wireless communication with left controller 3 and/or right controller 4. Though any scheme is applicable for communication between main body apparatus 2 and each controller, for example, a communication scheme under the Bluetooth™ specifications can be adopted.

CPU 81 is connected to left terminal 17, right terminal 21, and lower terminal 27. CPU 81 transmits and receives data to and from left controller 3 through left terminal 17 when wired communication with left controller 3 is established. CPU 81 transmits and receives data to and from right controller 4 through right terminal 21 when wired communication with right controller 4 is established. Data transmitted from CPU 81 to left controller 3 or right controller 4 is, for example, data for controlling a vibration generation portion of left controller 3 or right controller 4. Data received by CPU 81 from left controller 3 or right controller 4 is, for example, operation data output in response to an operation by a user of the operation portion in left controller 3 or right controller 4. CPU 81 transmits data to cradle 5 through lower terminal 27 when it communicates with cradle 5.

In the present embodiment, main body apparatus 2 can establish both of wired communication and wireless communication with left controller 3 and right controller 4.

Main body apparatus 2 includes a touch panel controller 86 for control of touch panel 13. Touch panel controller 86 generates data indicating a position of a touch input in response to a signal from touch panel 13, and outputs the data to CPU 81.

Display 12 shows an image generated by execution of various types of processing by CPU 81 and/or an image obtained from the outside.

Main body apparatus 2 includes a codec circuit 87 and speaker 88 (specifically, the left speaker and the right speaker). Codec circuit 87 controls input and output of audio data to and from speaker 88 and audio input and output terminal 25. More specifically, when codec circuit 87 receives audio data from CPU 81, it outputs an audio signal resulting from D/A conversion of the audio data to speaker 88 or audio input and output terminal 25. Thus, sound is output from speaker 88 or an audio output portion (for example, an earphone) connected to audio input and output terminal 25. When codec circuit 87 receives an audio signal from audio input and output terminal 25, it subjects the audio signal to A/D conversion and outputs audio data in a predetermined format to CPU 81.

Main body apparatus 2 includes an electric power control unit 97 and a battery 98. Electric power control unit 97 controls supply of electric power from battery 98 to each component based on a command from CPU 81. Electric power control unit 97 controls supply of electric power in accordance with an input onto power button 28. When an operation to turn off power supply is performed on power button 28, electric power control unit 97 stops supply of electric power totally or in part, and when an operation to turn on power supply is performed on power button 28, it starts full supply of electric power.

When an external charging apparatus (for example, cradle 5) is connected to lower terminal 27 and electric power is supplied to main body apparatus 2 through lower terminal 27, battery 98 is charged with supplied electric power.

(b2: Internal Configuration of Controller)

Figure 8:
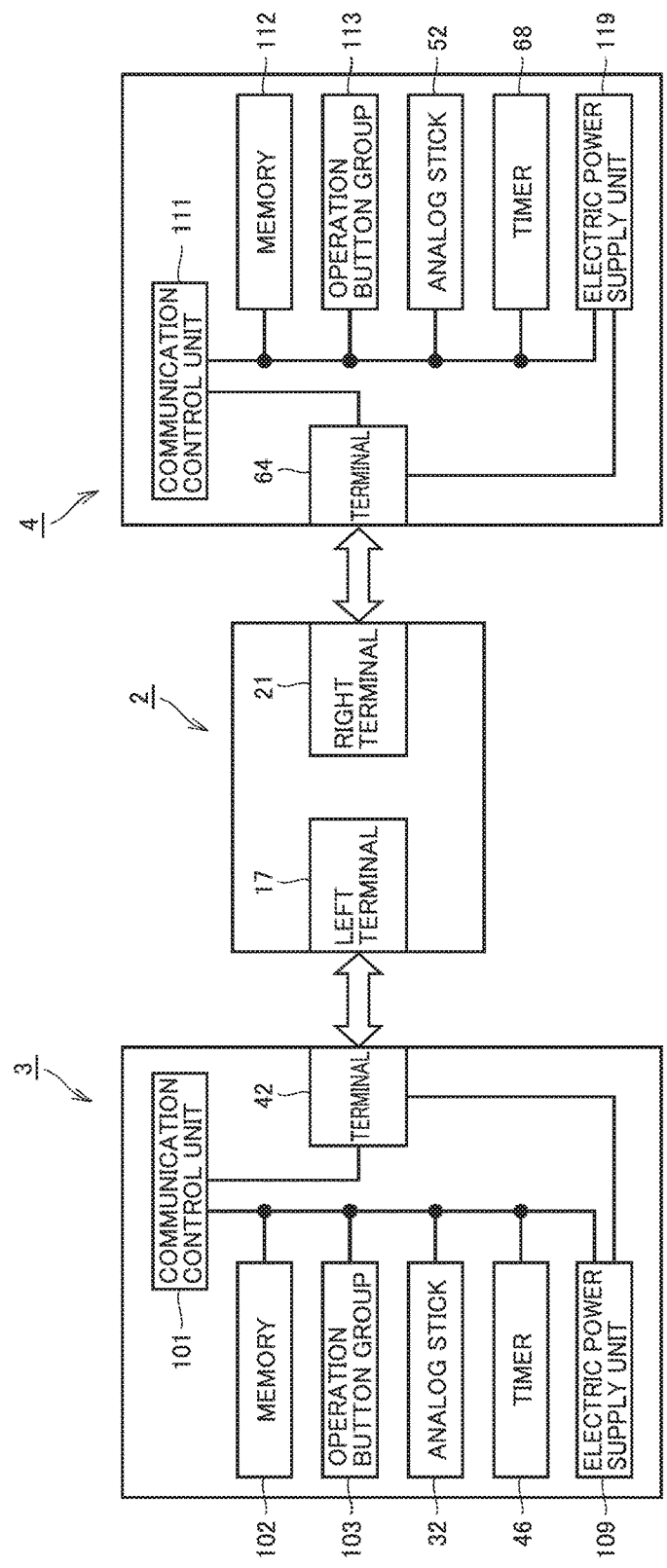
FIG. 8 is an example non-limiting block diagram showing an internal configuration of left controller 3 and right controller 4 according to the present embodiment.

FIG. 8 is an example non-limiting block diagram showing an internal configuration of left controller 3 and right controller 4 according to the present embodiment.

FIG. 8 also depicts components of main body apparatus 2 associated with left controller 3 and right controller 4.

Left controller 3 includes a communication control unit 101 for communication with main body apparatus 2. Communication control unit 101 can communicate with main body apparatus 2 through both of wired communication through terminal 42 and wireless communication not through terminal 42. Communication control unit 101 selects wired communication or wireless communication depending on whether or not left controller 3 is attached to main body apparatus 2, and establishes communication under a selected communication method. While left controller 3 is attached to main body apparatus 2, communication control unit 101 establishes communication with main body apparatus 2 through terminal 42. While left controller 3 is detached from main body apparatus 2, communication control unit 101 establishes wireless communication with main body apparatus 2 (specifically, controller communication unit 83). Communication control unit 101 should only be able to establish communication with the main body apparatus, and for example, it may be configured to establish only either wired communication or wireless communication. While left controller 3 is detached from main body apparatus 2, wireless communication is established by way of example, however, wired communication may be established, for example, through a cable.

Left controller 3 includes, for example, a memory 102 such as a flash memory. Communication control unit 101 is implemented, for example, by a microprocessor and performs various types of processing by executing firmware stored in memory 102.

Left controller 3 includes an operation button group 103 (specifically operation buttons 33 to 36, 38, and 39), analog stick 32, and a timer 46. Information on an operation onto operation button group 103 and analog stick 32 is repeatedly output to communication control unit 101 with a predetermined period.

Information on an operation onto operation button group 103 is stored also in memory 102 together with an operation time determined by timer 46.

Communication control unit 101 obtains information on an input from each of operation button group 103 and analog stick 32 (for example, information on an operation by a user). Communication control unit 101 transmits data including obtained information (or information obtained by subjecting obtained information to predetermined processing) to main body apparatus 2. Data is transmitted to main body apparatus 2 repeatedly with a predetermined period. A period of transmission of information on an input to main body apparatus 2 may or may not be identical among input devices.

Main body apparatus 2 can know an input given to left controller 3 based on transmitted data. More specifically, main body apparatus 2 can discriminate an operation onto operation button group 103 and analog stick 32.

Left controller 3 has an electric power supply unit 109 including a battery and an electric power control circuit. Electric power supply unit 109 controls power supply to each component of left controller 3. When left controller 3 is attached to main body apparatus 2, the battery is charged by power feed from main body apparatus 2 through terminal 42.

Electric power supply unit 109 gives battery warning information to main body apparatus 2 when the battery runs out of electric power.

Right controller 4 is configured basically similarly to left controller 3 described above. Right controller 4 includes a communication control unit 111, an operation button group 113 (specifically operation buttons 53 to 56, 60, and 61), analog stick 52, a timer 68, and an electric power supply unit 119. When the battery runs out of electric power, electric power supply unit 119 gives battery warning information to main body apparatus 2.

Information on an operation onto operation button group 113 is stored also in memory 112 together with an operation time determined by timer 68.

Since other components of right controller 4 have features and functions the same as those of corresponding components described in connection with left controller 3, detailed description will not be repeated.

Thus, game device 1 according to the present embodiment includes left controller 3 held in the left hand of the user (one hand) (a portion held in the left hand of the user) and right controller 4 held in the right hand (the other hand) of the user (a portion held in the right hand of the user).

The "operation portion" herein may mean a function or a feature accepting an operation by a user and encompass any component such as a button, an analog stick, and various sensors arranged in main body apparatus 2, left controller 3, and right controller 4, so long as it can sense an operation performed by a user. The operation portion may be configured to be able to sense an operation by the user based on combination of a button, an analog stick, and various sensors as being distributed in main body apparatus 2, left controller 3, and right controller 4.

[C. Manner of Use of Game System]

As described above, game device 1 according to the present embodiment is constructed such that left controller 3 and right controller 4 are removable. Game device 1 can output an image and sound to television 6 by being attached to cradle 5. Therefore, game device 1 can be used in various manners of use as will be described below. A main manner of use of game device 1 will be exemplified below.

(c1: Manner of Use with Controller being Attached to Main Body Apparatus)

FIG. 9 is an example non-limiting diagram showing one example of a manner of use of game device 1 with left controller 3 and right controller 4 being attached to main body apparatus 2 (hereinafter also referred to as an "attached state").

As shown in FIG. 9, in the attached state, game device 1 can be used as a portable device.

In the attached state, basically, communication between main body apparatus 2, and left controller 3 and right controller 4 is established through wired communication. In another embodiment, communication between main body apparatus 2, and left controller 3 and right controller 4 may be established through wireless communication also in the attached state.

In the attached state, four operation buttons 33 to 36 of left controller 3 may be used for inputting a direction (that is, an instruction for a direction). A user can input a direction with analog stick 32 or operation buttons 33 to 36. Since the user can input a direction with his/her preferred operation means, operability can be improved. For which instruction operation buttons 33 to 36 are used may arbitrarily be determined depending on a program executed in main body apparatus 2.

In the present embodiment, arrangement of the analog stick and four operation buttons (that is, A, B, X, and Y buttons) is reverse between left controller 3 and right controller 4. In the attached state, analog stick 32 is arranged above four operation buttons 33 to 36 in left controller 3, whereas four operation buttons 53 to 56 are arranged above analog stick 52 in right controller 4. Therefore, when a user holds game device 1 with his/her both hands being located at the same height (that is, at positions the same in the up-down direction) as shown in FIG. 9, the analog stick is located at a position readily operable with one hand and the four operation buttons are located at positions readily operable with the other hand. Game device 1 according to the present embodiment thus provides a feature facilitating an operation of the analog stick and four operation buttons.

(c2: Manner of Use with One Set of Controllers being Detached from Main Body Apparatus)

Figure 10:
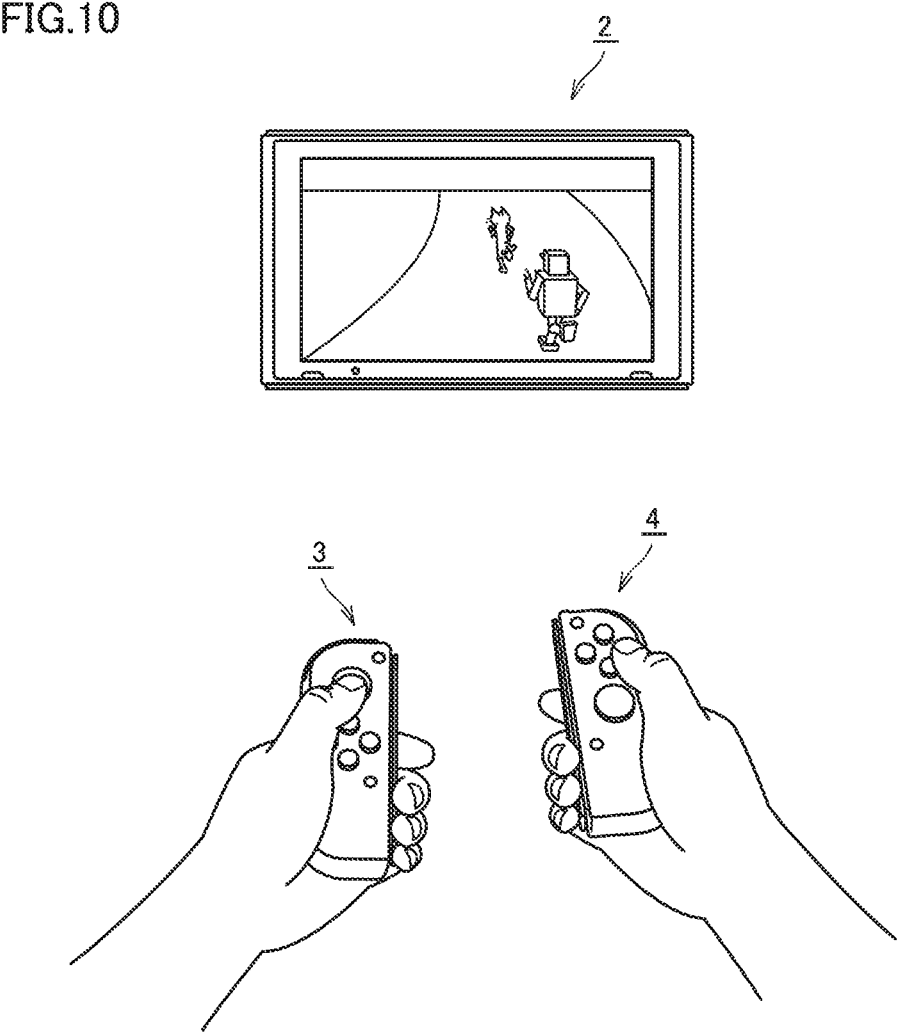
FIG. 10 is an example non-limiting diagram showing one example of a manner of use of game device 1 with left controller 3 and right controller 4 being detached from main body apparatus 2.

FIG. 10 is an example non-limiting diagram showing one example of a manner of use of game device 1 with left controller 3 and right controller 4 being detached from main body apparatus 2 (hereinafter also referred to as a "detached state").

As shown in FIG. 10, in the detached state, the user can operate left controller 3 and right controller 4 in his/her left and right hands, respectively.

In this case, analog stick 32 and four operation buttons 33 to 36 of left controller 3 are operated as being arranged vertically in the left hand in which the controller is held.

Similarly, analog stick 52 and four operation buttons 53 to 56 of right controller 4 are operated as being arranged vertically in the right hand in which the controller is held.

The controller is used such that the main surface thereof is vertically oriented when the user holds the controller (also referred to as an operation in vertical holding).

In the detached state, basically, communication between main body apparatus 2, and left controller 3 and right controller 4 is established through wireless communication. Main body apparatus 2 receives data from the controller with which it has established wireless communication and performs game processing based on the received data.

In the present embodiment, in wireless communication, main body apparatus 2 distinguishes between left controller 3 and right controller 4 which are communication counterparts. Main body apparatus 2 identifies whether the data received from the controller is from left controller 3 or from right controller 4.

Though FIG. 10 shows a manner of use by one user of one set of controllers (the left controller and the right controller), such a manner of use that two users use the respective controllers is also applicable. In this case, two users can simultaneously participate in a game with one set of controllers (the left controller and the right controller).

Though FIG. 10 shows a state that both of left controller 3 and right controller 4 are detached from main body apparatus 2, limitation thereto is not intended and any one of left controller 3 and right controller 4 can be detached from main body apparatus 2 and game device 1 can be used with the other being attached to main body apparatus 2.

(c3: Manner of Use of Respective Controllers by Two Users)

FIG. 11 is an example non-limiting diagram showing one example of a manner of use of game device 1 with two users each holding one controller in the detached state.

As shown in FIG. 11, two users can perform operations in the detached state. Specifically, one user (called a "first user") uses left controller 3 to perform an operation and the other user (called a "second user") can use right controller 4 to perform an operation. Game device 1 performs, for example, information processing for controlling an operation of a first object (for example, a player character) in a virtual space based on an operation onto left controller 3 and for controlling an operation of a second object in the virtual space based on an operation onto right controller 4. In the manner shown in FIG. 11 as well, as in the manner shown in FIG. 10, the user can perform an operation onto the operation portion included in the controller and/or an operation to move the controller itself.

In this case, analog stick 32 and four operation buttons 33 to 36 in left controller 3 used by the first user are operated as being arranged laterally between the left and right hands in which the controller is held.

Similarly, analog stick 52 and four operation buttons 53 to 56 in right controller 4 used by the second user are operated as being arranged laterally between the left and right hands in which the controller is held.

The controller is used such that the main surface thereof is laterally oriented when the user holds the controller (also referred to as an operation in lateral holding).

Though description will be given later, under an operation scheme in lateral holding of left controller 3 and right controller 4, functions of the operation portions in left controller 3 and right controller 4 are changed from those in an operation scheme in vertical holding.

In the present embodiment, positional relation between analog stick 52 and operation buttons 53 to 56 in right controller 4 is opposite to positional relation between these two types of operation portions in left controller 3. Therefore, when two users hold left controller 3 and right controller 4 in the same orientation, for example, as shown in FIG. 11, positional relation between the two types of operation portions is the same between the two controllers. In the present embodiment, the user can use the two types of operation portions in left controller 3 and right controller 4 detached from main body apparatus 2 with similar operation feeling. Operability of the controller can thus be improved.

In the detached state, four operation buttons 33 to 36 of left controller 3 may be used to perform functions the same as those of four operation buttons 53 to 56 in right controller 4 (in other words, may be used for giving the same instruction).

Specifically, right direction button 33 may be used to perform a function the same as that of Y button 56, down direction button 34 may be used to perform a function the same as that of X button 55, up direction button 35 may be used to perform a function the same as that of B button 54, and left direction button 36 may be used to perform a function the same as that of A button 53. Thus, in the present embodiment, functions of operation buttons 33 to 36 may be changed between the attached state and the detached state. For which instruction each operation button is used may freely be determined depending on a program executed in main body apparatus 2.

In FIG. 11, in game device 1, a display area of display 12 of main body apparatus 2 is divided into two sections, and game device 1 shows an image for the first user (for example, an image including the first object) in one divided display area and shows an image for the second user (for example, an image including the second object) in the other divided display area. Depending on an application executed in game device 1, however, game device 1 may show an image for two users (for example, an image including both of the first object and the second object) without the display area of display 12 being divided.

In the manner shown in FIG. 11 as well, as in the manner shown in FIG. 10, communication between main body apparatus 2, and left controller 3 and right controller 4 is established through wireless communication. Main body apparatus 2 distinguishes between controllers to be communication counterparts.

(c4: Manner of Use of Television)

FIG. 12 is an example non-limiting diagram showing one example of a manner of use of game device 1 with main body apparatus 2 being attached to cradle 5.

As shown in FIG. 12, by attaching main body apparatus 2 to cradle 5, an image obtained or generated by game device 1 can be shown on television 6. A user operates left controller 3 and/or right controller 4 while the user watches an image shown on television 6 (and an image shown on the display of main body apparatus 2 as necessary).

(c5: Manner of Use of Three or More Controllers)

As described above, in the present embodiment, main body apparatus 2 can communicate with a plurality of left controllers. Main body apparatus 2 can communicate with a plurality of right controllers. Therefore, in the present embodiment, three or more controllers can simultaneously be used.

Figure 13A:
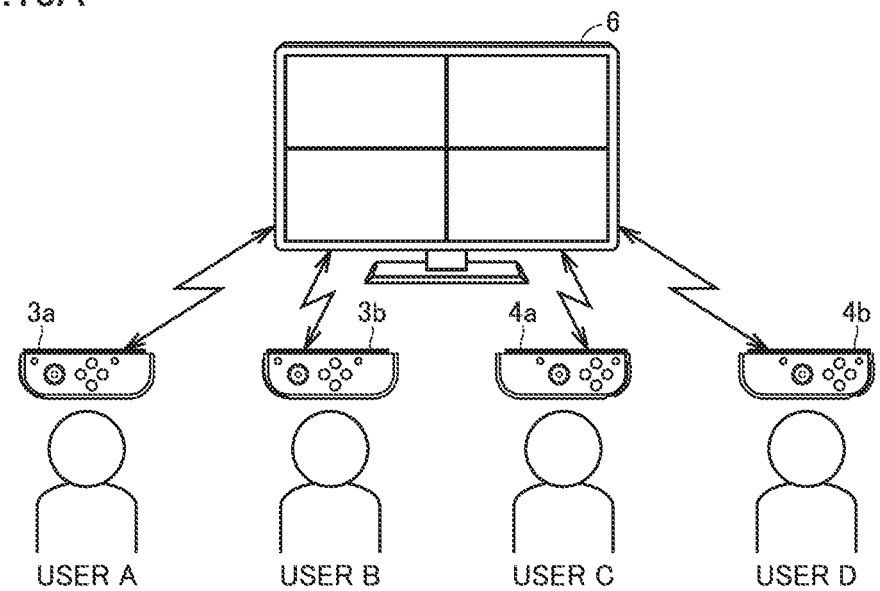
FIGS. 13A and 13B are example non-limiting diagrams showing examples of a manner of use of three or more controllers.
Figure 13B:
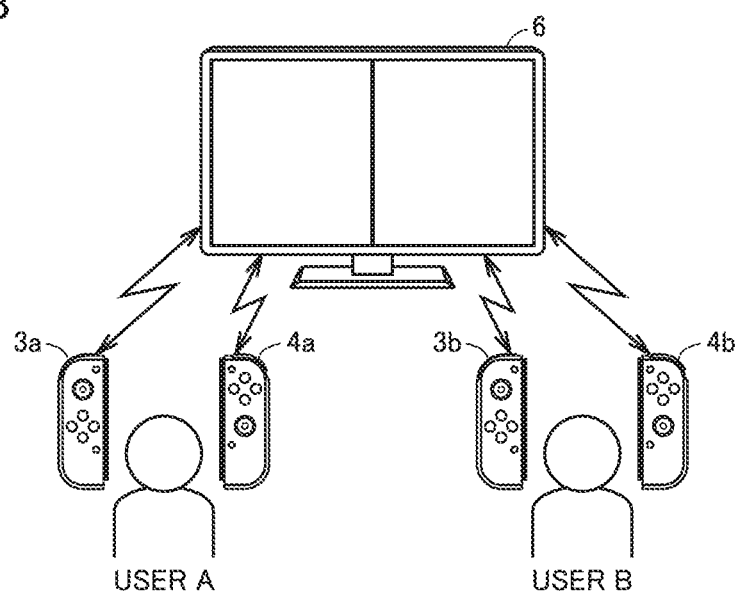

FIGS. 13A and 13B are example non-limiting diagrams showing examples of a manner of use of three or more controllers.

FIGS. 13A and 13B show examples in which four controllers in total of two left controllers 3a and 3b and two right controllers 4a and 4b are used. Each controller is detached from main body apparatus 2. Thus, when the four controllers are used, at least a manner of use of one controller by each of four users (FIG. 13A) and a manner of use of two controllers by each of two users (specifically, one set of controllers on each of a left side and a right side) (FIG. 13B) are possible.

(Manner of Use of One Controller by One User)

In FIG. 13A, four controllers 3a, 3b, 4a, and 4b are used by respective users. In the present embodiment, when four controllers are prepared, four users of a user A to a user D can use the controllers to perform operations. Game device 1 performs, for example, information processing controlling an operation of an object corresponding to each controller based on an operation onto the controller.

In FIG. 13A, main body apparatus 2 establishes wireless communication with each of four controllers 3a, 3b, 4a, and 4b. In the present embodiment, main body apparatus 2 distinguishes among four controllers 3a, 3b, 4a, and 4b. Main body apparatus 2 identifies from which of the four controllers received operation data has come. In FIG. 13A, main body apparatus 2 distinguishes between left controller 3a and left controller 3b and distinguishes between right controller 4a and right controller 4b.

(Manner of Use of One Set of Controllers by One User)

In FIG. 13B, one user uses one set of controllers. User A uses one set of left controller 3a and right controller 4a, and user B uses one set of left controller 3b and right controller 4b. Thus, in the present embodiment, when four controllers are prepared, each of two users can operate one set of controllers.

Game device 1 performs information processing with two pieces of operation data received from one set of controllers being defined as one set. For example, game device 1 performs information processing controlling an operation of an object corresponding to one set of controllers based on an operation onto that one set of controllers. Specifically, an operation of the first object is controlled based on an operation onto left controller 3a and right controller 4a, and an operation of the second object is controlled based on an operation onto left controller 3b and right controller 4b.

In the present embodiment, in the manner of use shown in FIG. 13B, main body apparatus 2 sets a set of a left controller and a right controller to be used by one user. Main body apparatus 2 performs information processing by using two pieces of operation data from the two controllers included in the set as one set (for example, using the data as operation data for controlling one operation target).

Any method may be adopted as a method of setting a set of controllers, and in the present embodiment, a set is set by attaching left and right controllers to main body apparatus 2. Main body apparatus 2 sets simultaneously attached left controller and right controller as one set of controllers. For example, when a set of controllers shown in FIG. 13B is set, the user initially attaches left controller 3a and right controller 4a to main body apparatus 2, detaches left controller 3a and right controller 4a from main body apparatus 2, and thereafter attaches left controller 3b and right controller 4b to main body apparatus 2. Thus, a set of left controller 3a and right controller 4a and a set of left controller 3b and right controller 4b can be set (or registered) in main body apparatus 2.

When three or more controllers are used, other than manners of use shown in FIGS. 13A and 13B, the information processing system can be used in various manners. For example, the information processing system can be used in such a manner that one user uses a set of controllers consisting of left and right controllers and another user uses one controller. Alternatively, for example, one user can use a controller attached to main body apparatus 2 and another user can use a controller detached from main body apparatus 2.

(c6: Advantages in Terms of Operation)

In the present embodiment, game device 1 can provide a user with an operation to move a controller (without moving a display) while it is a portable device. Game device 1 can also provide a game device allowing a user to perform an operation at a location distant from display 12 while it is a portable device.

[F: Controller Registration Processing]

Figure 14A:
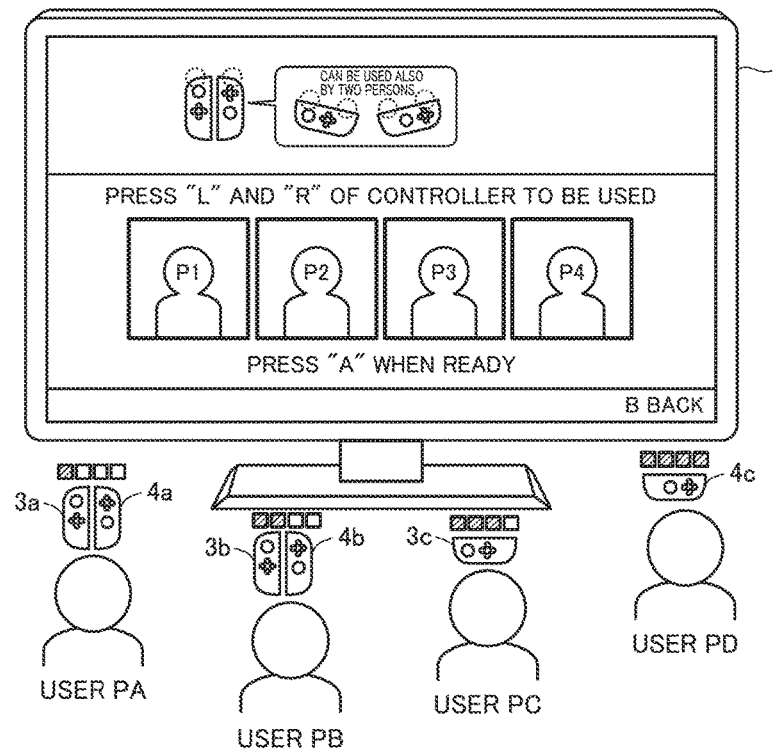
FIGS. 14A and 14B are example non-limiting diagrams showing examples illustrating a controller registration screen displayed by game device 1 based on an embodiment.
Figure 14B:
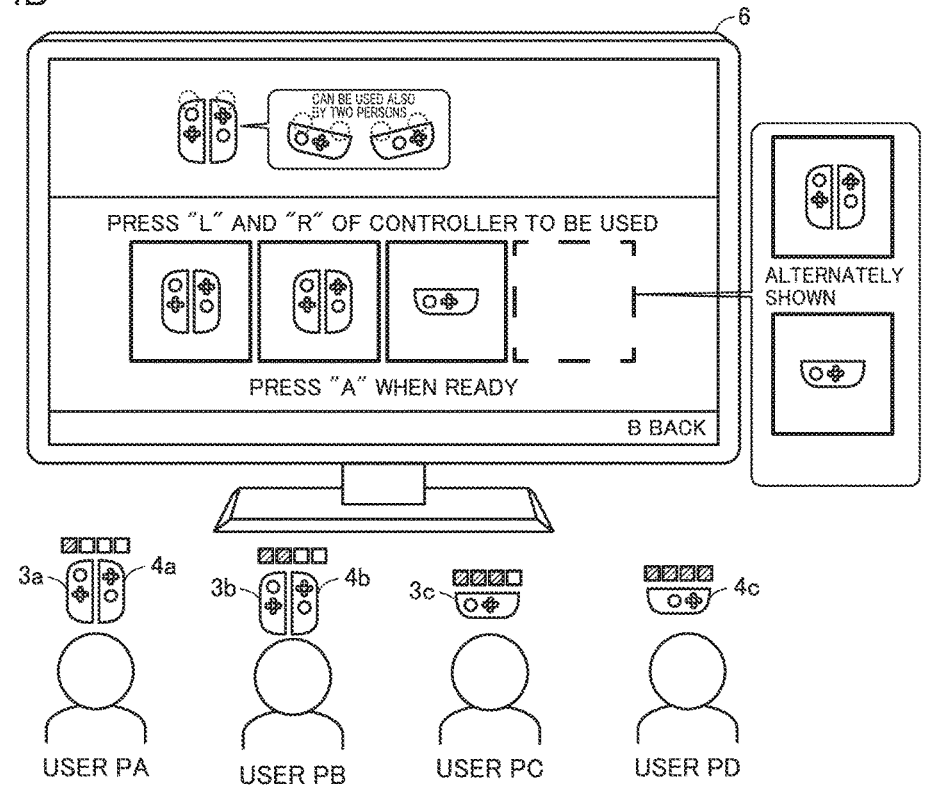

FIGS. 14A and 14B are example non-limiting diagrams showing examples illustrating a controller registration screen displayed by game device 1 based on an embodiment.

As shown in FIGS. 14A and 14B, controllers held by users PA to PD representing four players are registered in a controller registration screen shown on television 6. In the present example, main body apparatus 2 registers a controller with which pairing has been completed.

The controller registration screen represents one example of a screen shown when controller registration is indicated in a home menu. The home menu is provided to allow launch of a game application together with various types of setting (controller registration). For example, an icon for launching a game application is provided, and a game application is launched by selecting the icon. An icon for registering a controller is also provided. An application for controller registration processing is launched by selecting the icon and the controller registration screen is shown.

An instruction for registration of a controller can be given also from each game application, and in that case, a manner of an available controller is shown depending on a game application. Since an instruction for registration of a controller can also be given from each game application, it is not necessary to perform a bothersome procedure for performing setting processing by returning to the home menu, and hence usability can be improved.

Television 6 in the present example in FIG. 14A shows a message that "press 'L' and 'R' of controller to be used." In the present example, each user is invited to press the L button and the R button in registration of a controller held by each user.

Through a series of processes in response to pressing, a player number is registered for a controller of each user. One operation scheme is set in a controller adapted to a plurality of operation schemes.

In the present example, any of an operation scheme in vertical holding of two controllers and an operation scheme in lateral holding of one controller representing a plurality of operation schemes is set. For example, in specifying an operation scheme, an operation scheme may be specified based on whether two controllers or one controller are/is held, or an operation scheme can also be specified based on whether the controller is held vertically or laterally.

A controller can be registered in accordance with such a message.

A state that a controller has not been registered is shown. A player number is allocated as a controller is registered. Then, a manner of a registered controller corresponding to the allocated player number is schematically shown in areas from P1 to P4 corresponding to player numbers.

A manner of a controller which can be registered is shown in an upper area of the controller registration screen. Registration of two controllers of left controller 3 and right controller 4 and registration of one controller, that is, left controller 3 or right controller 4, are shown.

When two controllers are registered, in order to show a position of a button to be selected, together with an image of two controllers, the position is shown as being emphasized with a circular image being added. Possibility of use of two controllers by two persons is also shown. In registration of one controller, in order to show a position of a button to be selected, together with an image of one controller, the position is shown as being emphasized with a circular image being added.

A user can register a controller in a more simplified manner by checking on the controller registration screen, a position of the button emphasized by the circular image, together with the image of the controller.

By way of example, user PA holds left controller 3*a* and right controller 4*a*. User PB holds left controller 3*b* and right controller 4*b*. User PC holds a left controller 3*c*. User PD holds a right controller 4*c*.

When user PA registers two controllers, the user presses first L button 38 provided in left controller 3*a* and first R button 60 provided in right controller 4*a*.

When user PB registers two controllers, the user presses first L button 38 provided in left controller 3*b* and first R button 60 provided in right controller 4*b*.

When user PC registers one controller with left controller 3*c*, the user presses second L button 43 and second R button 44 provided in left controller 3*c*.

When user PD registers one controller with right controller 4*c*, the user presses second L button 65 and second R button 66 provided in right controller 4*c*.

Game device 1 receives operation data transmitted from each controller, allocates a player number to each controller based on the received operation data, and registers an operation scheme in registration information as necessary.

FIG. 14B shows an example in which a controller is registered in accordance with operation data.

Specifically, an image of two controllers held by user PA is shown as the controller to which a player number P1 is to be allocated.

An image of two controllers held by user PB is shown as the controller to which a player number P2 is to be allocated.

An image of one controller held by user PC is shown as the controller to which a player number P3 is to be allocated.

A state that a player number P4 has not yet been registered (an area shown with a dotted line) is shown.

In the present example, a check image is shown in an area for player number P4 which has not yet been registered. In the check image, an image of a controller representing an operation scheme in lateral holding and an image of a controller representing an operation scheme in vertical holding are alternately shown.

By showing the image of two controllers for which the operation scheme in vertical holding has been registered and an image of one controller for which the operation scheme in lateral holding has been registered, difference in manner of a method of operation of the controller is clearly shown and hence usability is improved. By further showing a name and a function of a button of the controller for which the operation scheme in vertical holding has been registered together with the image, information on the method of operation may be presented. By further showing a name and a function of a button of the controller for which the operation scheme in lateral holding has been registered together with the image, information on the method of operation may be presented.

FIG. 15 is an example non-limiting diagram illustrating one example of registration information based on the embodiment.

As shown in FIG. 15, registration information include number information, identification information, information associated with wireless communication information, a player number, and information on an operation scheme. The number information is represented by a number provided to a registered controller.

The identification information is information representing a value (for example, an ID) specifically provided to a controller. A controller can uniquely be identified based on the identification information.

In the present embodiment, the identification information includes information indicating whether a controller is the left controller or the right controller. Main body apparatus 2 can determine based on the identification information provided to the controller whether the controller is the left controller or the right controller. In another embodiment, the identification information does not have to include information indicating whether the controller is the left controller or the right controller. The registration information may include (separately from the identification information) information indicating whether a controller is the left controller or the right controller.

The wireless communication information indicates whether connection setting (that is, pairing) in connection with wireless communication with main body apparatus 2 has been made. When pairing between main body apparatus 2 and a controller has been completed, information indicating "set" is stored as wireless communication information associated with the controller. When pairing between main body apparatus 2 and a controller has not been completed, information indicating "not set" is stored as wireless communication information associated with the controller. Main body apparatus 2 may store information on connection setting for wireless communication (separately from the registration information), and does not have to carry out pairing again with the controller with which pairing has once been done.

In the present example, main body apparatus 2 registers a paired controller.

A player number represents identification information specifying a player operated in an application. The player number may be allocated in the order of registration of players or randomly by way of example.

Information on the operation scheme represents information indicating a selected operation scheme when selection from among a plurality of operation schemes can be made for a controller. For left controller 3 and right controller 4 in the present example, an operation in vertical holding and an operation in lateral holding representing a plurality of operation schemes can be selected as described with reference to FIGS. 10 and 11.

Some of registration information may be deleted or changed in accordance with an instruction from a user. For example, main body apparatus 2 may delete information on a designated controller and change information on a number provided to the controller, a player number, and an operation scheme in accordance with an instruction from a user.

A functional block configuration of main body apparatus 2 based on the embodiment will now be described.

Figure 16:
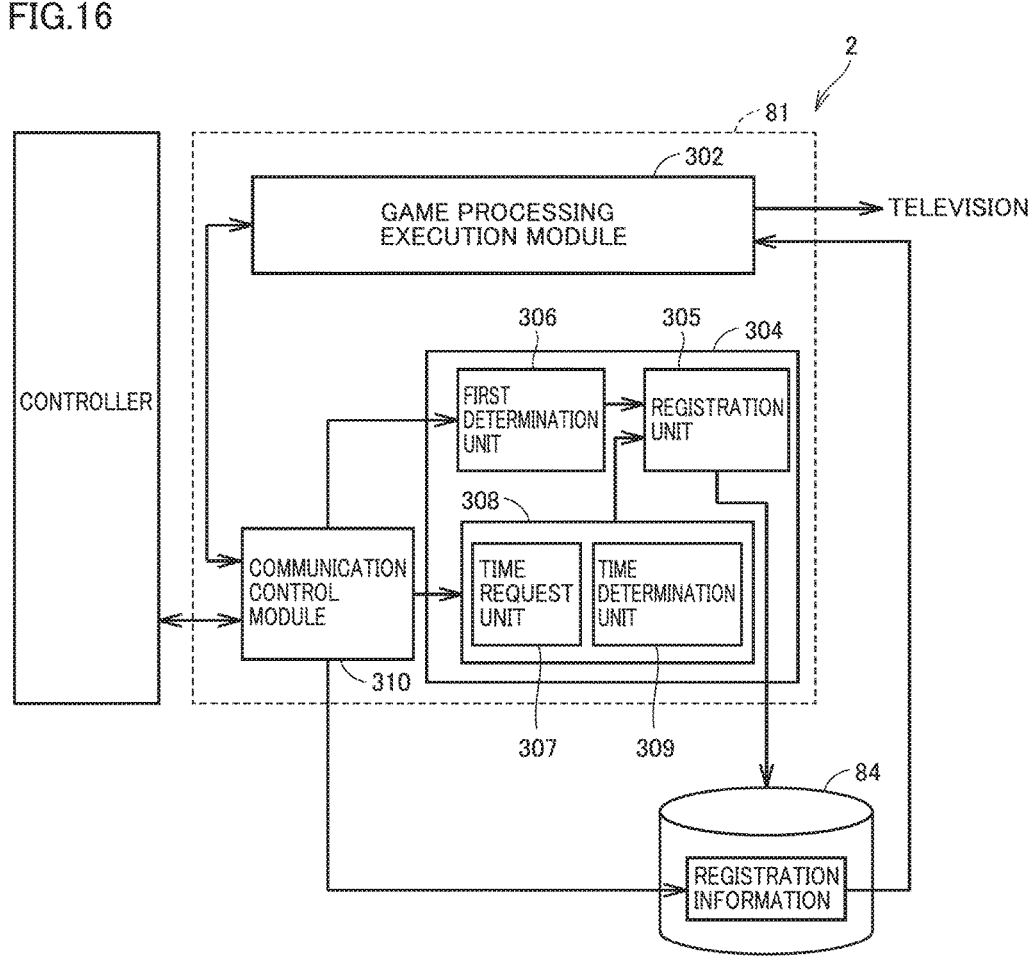
FIG. 16 is an example non-limiting diagram illustrating a functional block configuration of main body apparatus 2 based on the embodiment.

FIG. 16 is an example non-limiting diagram illustrating a functional block configuration of main body apparatus 2 based on the embodiment.

Referring to FIG. 16, a game processing execution module 302, a registration processing module 304, and a communication control module 310 are implemented by execution of a program by CPU 81 of main body apparatus 2.

A program implementing the functional block is read, for example, from flash memory 84 of main body apparatus 2 or a memory card attached to the first slot, saved in DRAM 85, and executed.

Communication control module 310 makes setting (also called pairing) for wireless communication between main body apparatus 2 and a controller.

Communication control module 310 determines whether or not pairing has been completed through wireless communication with a controller. When it is determined through wireless communication with the controller that pairing has not been completed, the communication control module performs pairing processing for wireless communication with the controller and obtains identification information of the controller. Then, communication control module 310 has the memory register necessary registration information. Specifically, the registration information stored in the memory is updated so as to add number information, identification information, and wireless communication information of the controller in association with the registration information. For number information, for example, information indicating a number which has not been set for another registered controller is set. Identification information provided to the controller is set. As pairing is completed, information indicating "set" is set.

Communication control module 310 performs processing for establishing communication connection with the paired controller. After communication connection between communication control module 310 and the controller is established, processing for registering a player number and an operation scheme is performed.

Registration processing module 304 performs controller registration processing via communication control module 310. Specifically, a player number is registered and updated in the registration information in the flash memory. An operation scheme of the controller is registered as necessary.

Game processing execution module 302 is a module controlling game processing and successively updates contents of representation on display 12 in accordance with contents of an operation by a user.

Registration processing module 304 includes a registration unit 305, a first determination unit 306, and a second determination unit 308.

Registration unit 305 has the memory register a predetermined operation scheme as the registration information as necessary based on a result of determination by first determination unit 306 or second determination unit 308.

First determination unit 306 determines whether or not operation data received from a controller with which communication connection has been established satisfies a predetermined condition.

An example of the predetermined condition includes whether or not the operation data has second L button and second R button operation data.

When it is determined that the predetermined condition is satisfied or when determination as OK is made (a result of determination is affirmative), registration unit 305 has the operation scheme in lateral holding registered in the registration information as an operation scheme of the controller.

Another example of the predetermined condition is determination as to whether or not first L button operation data and first R button operation data have simultaneously been received.

When it is determined that the predetermined condition is satisfied or when determination as OK (a result of determination is affirmative), registration unit 305 has the operation scheme in vertical holding registered in the registration information as an operation scheme of the controller.

Second determination unit 308 determines whether or not operation data received from a controller with which communication connection has not been established satisfies a predetermined condition.

Second determination unit 308 includes a time request unit 307 and a time determination unit 309.

Time request unit 307 requests a controller of transmission of information on an operation time. In response to the request, the controller transmits information on the operation time.

Time determination unit 309 obtains transmitted information on the operation time and determines whether or not an operation of the controller satisfies a predetermined condition.

Specifically, second determination unit 308 determines whether or not operations onto second L button 43 and second R button 44 have substantially simultaneously been performed in left controller 3. Second determination unit 308 determines whether or not operations onto second L button 65 and second R button 66 have substantially simultaneously been performed in right controller 4. By way of example of a determination scheme, whether or not a time difference between two pieces of information on operation times is within a predetermined period is determined based on the information on the operation time. When it is determined that the time difference between the two pieces of information on the operation times is within the predetermined period, determination as OK is made. When it is determined that the time difference between the two pieces of information on the operation times is not within the predetermined period, determination as NG is made.

When determination as OK (a result of determination is affirmative) is made based on a result of determination by second determination unit 308, registration unit 305 registers a predetermined scheme as the operation scheme of the controller. In the present example, registration unit 305 registers the operation scheme in lateral holding in the registration information.

FIG. 17 is an example non-limiting flowchart illustrating processing for transmission of data on left controller 3 based on the embodiment.

Processing in each step in the flowchart shown in FIG. 17 is merely by way of example. So long as similar results can be obtained, an order of processing in the steps may be changed or another processing may be performed in addition to (or instead of) processing in each step.

Referring to FIG. 17, communication control unit 101 of left controller 3 determines whether or not operation button group 103 has been operated (step ST0).

When communication control unit 101 determines in step ST0 that operation button group 103 has been operated (YES in step ST0), it determines whether or not communication connection with main body apparatus 2 has been established (step ST1).

When communication control unit 101 determines in step ST0 that operation button group 103 has not been operated (NO in step ST0), the state in step ST0 is maintained.

When communication control unit 101 determines in step ST1 that communication connection with main body apparatus 2 has been established (YES in step ST1), it transmits operation data to main body apparatus 2 (step ST2). The operation data includes identification information data and information on an operated button.

Then, the process ends (end).

When communication control unit 101 determines in step ST1 that communication connection with main body apparatus 2 has not been established (NO in step ST1), it transmits a connection request for establishing communication connection to main body apparatus 2 (step ST3).

Then, communication control unit 101 has memory 102 store operation information resulting from an operation of operation button group 103 (step ST4). Together with the information on the operated operation button, information on time obtained by timer 46 at which the operated operation button has been operated is stored in memory 102.

Then, the process ends (end).

Though left controller 3 has been described in the present example, the description is applicable also to right controller 4.

In the present example, communication control unit 101 has memory 102 store operation information when communication connection is not established. Operation information may be stored in memory 102 also when communication connection is established.

Figure 18A:
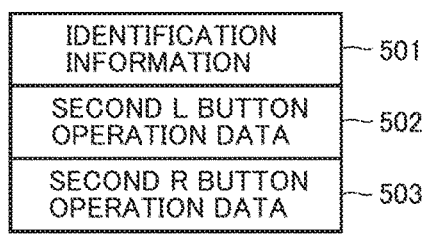
FIGS. 18A and 18B are example non-limiting diagrams illustrating operation data transmitted from the controller based on the embodiment to main body apparatus 2.
Figure 18B:
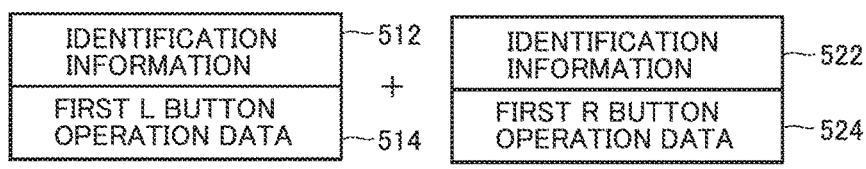

FIGS. 18A and 18B are example non-limiting diagrams illustrating operation data transmitted from the controller based on the embodiment to main body apparatus 2.

FIG. 18A shows operation data 500 transmitted from controller 3 by way of example. Operation data 500 includes identification information data 501, second L button operation data 502, and second R button operation data 503.

By way of example, second L button operation data 502 and second R button operation data 503 are operation data resulting when a user presses both of second L button 43 and second R button 44 provided in controller 3.

Though operation data of left controller 3 is described, operation data of right controller 4 is basically also similar. In the case of operation data of right controller 4, second L button operation data 502 and second R button operation data 503 are operation data resulting when a user presses both of second L button 65 and second R button 66 provided in right controller 4.

FIG. 18B shows operation data 510 and 520 transmitted from left controller 3 and right controller 4, respectively, by way of example.

Operation data 510 includes identification information data 512 and first L button operation data 514.

Operation data 520 includes identification information data 522 and first R button operation data 524.

By way of example, first L button operation data 514 is operation data resulting when a user presses first L button 38 provided in left controller 3. First R button operation data 524 is operation data resulting when a user presses first R button 60 provided in right controller 4.

In the controller registration screen described with reference to FIGS. 14A and 14B, by way of example, when user PC presses second L button 43 and second R button 44 provided in left controller 3c, operation data described with reference to FIG. 18A is transmitted to main body apparatus 2. First determination unit 306 of registration processing module 304 determines whether or not the received operation data includes the second L button and second R button operation data. Registration unit 305 registers the operation scheme in lateral holding in the registration information based on a result of determination by first determination unit 306.

In the controller registration screen described with reference to FIGS. 14A and 14B, by way of example, when user PA presses first L button 38 provided in left controller 3a and first R button 60 provided in right controller 4a, operation data described with reference to FIG. 18B is transmitted to main body apparatus 2. First determination unit 306 of registration processing module 304 determines whether or not the first L button operation data and the first R button operation data have simultaneously been received. Registration unit 305 registers the operation scheme in vertical holding in the registration information based on a result of determination by first determination unit 306.

FIGS. 19A and 19B are example non-limiting diagrams illustrating operation information stored in memory 102 based on the embodiment.

FIG. 19A shows storage of data corresponding to two operations as operation information.

By way of example, while communication connection with main body apparatus 2 has not been established, an operation onto second L button 43 and second R button 44 is performed. The operation is registered in association with time.

FIG. 19B shows storage of data corresponding to one operation as operation information.

By way of example, while communication connection with main body apparatus 2 has not been established, an operation onto first L button 38 is performed. The operation is registered here again in association with time.

The operation information is used for determination processing in second determination unit 308.

FIG. 20 is an example non-limiting flowchart illustrating one example of a flow of processing for registration of a controller with which communication connection has not been established, the processing being performed in main body apparatus 2 based on the embodiment.

Processing in each step in the flowchart shown in FIG. 20 is merely by way of example. So long as similar results can be obtained, an order of processing in the steps may be changed or another processing may be performed in addition to (or instead of) processing in each step. Though processing in each step in the flowchart is described as being performed by CPU 81 of main body apparatus 2 in the present embodiment, processing in some steps in the flowchart may be performed by a processor or a dedicated circuit other than CPU 81. A part of processing performed in main body apparatus 2 may be performed by another information processing apparatus which can communicate with main body apparatus 2 (for example, a server which can communicate with main body apparatus 2 through a network). Each processing shown in FIG. 20 may be performed by cooperation of a plurality of information processing apparatuses including main body apparatus 2.

Referring to FIG. 20, CPU 81 determines whether or not there is a request for connection of a controller (step S2). CPU 81 determines whether or not it has received a connection request from a controller with which communication connection has not been established.

When CPU 81 determines that it has received a request for connection of a controller (YES in step S2), it performs connection processing (step S4).

Specifically, when it is determined that communication connection with a controller has not been established, communication control module 310 performs processing for establishing communication connection between main body apparatus 2 and a controller (communication connection processing).

Then, CPU 81 requests for an elapsed time (step S6). Communication control module 310 notifies second determination unit 308 of registration processing module 304 of completion of communication connection processing. Time request unit 307 of second determination unit 308 requests the controller with which communication connection processing has been completed of transmission of information on an operation time.

Figure 21:
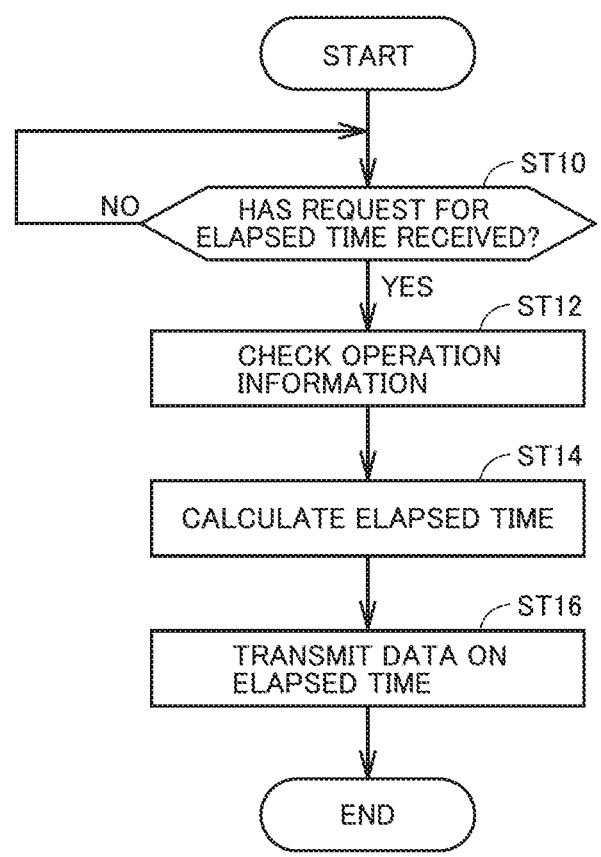
FIG. 21 is an example non-limiting flowchart illustrating transmission of an elapsed time by the controller based on the embodiment.

FIG. 21 is an example non-limiting flowchart illustrating transmission of an elapsed time by the controller based on the embodiment.

Processing in each step in the flowchart shown in FIG. 21 is merely by way of example. So long as similar results can be obtained, an order of processing in the steps may be changed or another processing may be performed in addition to (or instead of) processing in each step.

Referring to FIG. 21, communication control unit 101 of left controller 3 determines whether or not it has received a request for an elapsed time (step ST10).

When communication control unit 101 determines in step ST10 that it has received a request for an elapsed time (YES in step ST10), it checks operation information (step ST12). Specifically, communication control unit 101 checks information on a time at which the operation button has been operated which is stored in memory 102.

Then, communication control unit 101 calculates an elapsed time (step ST14). Specifically, communication control unit 101 calculates the elapsed time by comparing the time of reception of the request for the elapsed time with the time of an operation of the operation button stored in memory 102. As shown in FIG. 19A, when information on a plurality of operation times which correspond to the operation data resulting from pressing of both of second L button 43 and second R button 44 is stored in memory 102, the elapsed time is calculated for each of them.

Then, communication control unit 101 transmits the elapsed time to main body apparatus 2 (step ST16). Communication control unit 101 transmits data on the calculated elapsed time to main body apparatus 2.

Then, the process ends (end).

When communication control unit 101 determines in step ST10 that it has not received a request for the elapsed time (NO in step ST10), the state in step ST10 is maintained.

Though left controller 3 has been described in the present example, the description is applicable also to right controller 4.

Referring again to FIG. 20, CPU 81 then determines whether or not it has received data (step S8). Communication control unit 310 determines whether or not it has received data from the controller.

When CPU 81 determines in step S8 that it has received data (YES in step S8), it performs determination processing (step S10). Details of the determination processing will be described later. When communication control module 310 determines that it has received the data, it outputs the data to time determination unit 309 of second determination unit 308.

Then, CPU 81 determines whether or not determination as OK is made (step S12). Registration unit 305 determines whether or not determination as OK is made, as a result of determination by second determination unit 308.

When CPU 81 determines in step S12 that determination as OK is made (YES in step S12), a player number is registered (step S14). Specifically, registration unit 305 registers a player number in registration information. A player number is registered in the order of registration of players. Player numbers are registered in such a manner that a first player is registered as P1, a second player is registered as P2, and so on. Then, CPU 81 registers the operation scheme in lateral holding in the registration information (step S16). Specifically, registration unit 305 registers information indicating the operation scheme in lateral holding in a field of the operation scheme in the registration information.

When CPU 81 determines in step S12 that determination as NG is made (NO in step S12), it has a check image shown (step S2). As described above, registration unit 305 has the check image shown. Registration unit 305 has the controller registration screen as described with reference to FIG. 14B shown.

Then, CPU 81 determines whether or not it has received operation data (step S24). Specifically, communication control module 310 determines whether or not it has further received operation data from the controller. CPU 81 maintains the state in step S24 until it receives operation data.

When CPU 81 determines in step S24 that it has received operation data (YES in step S24), the process proceeds to next step S26. Since operation data is received from a controller with which communication connection has been established, determination processing in first determination unit 306 is performed.

CPU 81 determines whether or not operation data has second L button and second R button operation data (step S26). Specifically, first determination unit 306 determines whether or not the operation data has second L button and second R button operation data.

Then, when CPU 81 determines that the operation data has second L button and second R button operation data (YES in step S26), a player number is registered for one controller (step S14). Specifically, registration unit 305 registers a player number in the registration information. A player number is registered in the order of registration of players. Player numbers are registered in such a manner that a first player is registered as P1, a second player is registered as P2, and so on. Then, CPU 81 registers the operation scheme in lateral holding in the registration information (step S16). Specifically, registration unit 305 registers information indicating the operation scheme in lateral holding in a field of the operation scheme in the registration information.

Then, CPU 81 updates the controller registration screen (step S18). Specifically, registration unit 305 has an image of the controller set in accordance with the order of registration of the player shown. For example, when a third player number is registered, the left controller operated as being laterally oriented is shown in an area third from the left in the controller registration screen. An indicator image indicating the third player number is shown as an indicator image. A notification LED in the corresponding left controller may be turned on in correspondence with the player number.

When CPU 81 determines in step S26 that the operation data does not have second L button and second R button operation data (NO in step S26), CPU 81 determines whether or not first L button operation data and first R button operation data have been simultaneously received (step S28). Specifically, as described with reference to FIG. 18B, first determination unit 306 determines whether or not one of a plurality of pieces of simultaneously received operation data includes first L button operation data and the other operation data includes first R button operation data.

When CPU 81 determines in step S28 that first L button operation data and first R button operation data have been simultaneously received (YES in step S28), a player number is registered for two controllers constituting a set (step S30). Specifically, registration unit 305 registers the player number in the registration information. The player number is registered for each of two controllers in accordance with the order of registration of the players. Player numbers are registered in such a manner that a first player is registered as P1, a second player is registered as P2, and so on.

In the present example, left controller 3 and right controller 4 constitute a set. Therefore, two left controllers or two right controllers do not constitute a set. Simultaneous reception of operation data is not limited to exactly the same timing of reception, and encompasses also an example where a period until reception of subsequent operation data after reception of first operation data is extremely short.

Then, CPU 81 registers the operation scheme in vertical holding in the registration information (step S32). Specifically, registration unit 305 registers information indicating the operation scheme in vertical holding in a field of the operation scheme in the registration information.

Then, CPU 81 updates the controller registration screen (step S18). Specifically, registration unit 305 has an image of a controller set in accordance with the order of registration of players shown. For example, when a first player number is registered, the left controller and the right controller operated as being vertically held are shown in an area first from the left in the controller registration screen. An indicator image indicating the first player number is shown as an indicator image. Notification LEDs in a left controller and a right controller corresponding to the player number may be turned on in correspondence with the player number.

Since subsequent processing is the same, detailed description thereof will not be repeated.

When CPU 81 determines in step S28 that the first L button operation data and the first R button operation data have not been simultaneously received (NO in step S28), the process proceeds to step S20.

In step S20, CPU 81 determines whether or not controller registration processing has ended (step S20). Specifically, when the "A" button is selected in the controller registration screen described with reference to FIGS. 14A and 14B, registration unit 305 determines that controller registration processing has ended.

When CPU 81 determines in step S20 that controller registration processing has ended (YES in step S20), the process ends (end).

When CPU 81 determines that controller registration processing has not ended (NO in step S20), the process returns to step S2 and the process is repeated.

Figure 22:
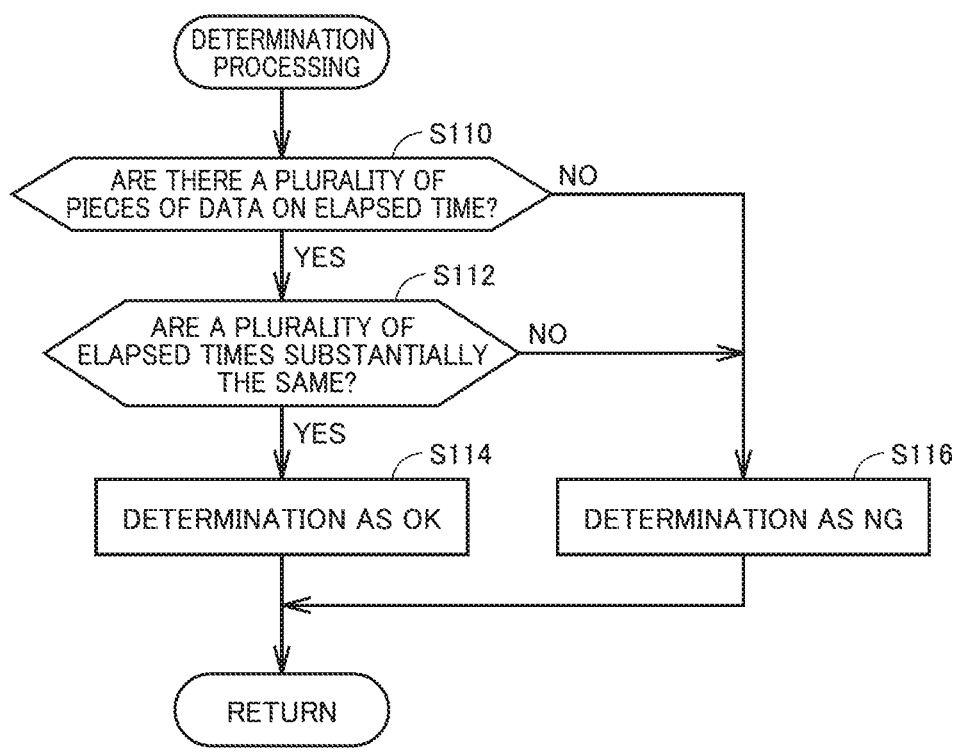
FIG. 22 is an example non-limiting flowchart illustrating a sub routine of determination processing performed in main body apparatus 2 based on the embodiment.

FIG. 22 is an example non-limiting flowchart illustrating a sub routine of determination processing performed in main body apparatus 2 based on the embodiment. The determination processing is processing in time determination unit 309.

As shown in FIG. 22, CPU 81 determines whether or not it has received a plurality of pieces of data on an elapsed time (step S110). Time determination unit 309 determines whether or not the received data includes a plurality of pieces of data on an elapsed time.

Then, when CPU 81 determines in step S110 that it has received a plurality of pieces of data on an elapsed time (YES in step S110), it determines whether or not a plurality of elapsed times are substantially the same (step S112). When time determination unit 309 determines that the received data includes a plurality of pieces of data on an elapsed time, it determines whether or not the pieces of data on an elapsed time have substantially the same value. Specifically, time determination unit 309 determines whether or not a time difference between two pieces of data on an elapsed time is within a predetermined period.

Then, when CPU 81 determines that the plurality of elapsed times are substantially the same (YES in step S112), it makes determination as OK (step S14). When time determination unit 309 determines that the pieces of data on an elapsed time have substantially the same value, it outputs determination as OK to registration unit 305.

Then, the process ends (return).

When CPU 81 determines in step S110 that it has not received a plurality of pieces of data on an elapsed time (NO in step S110) or when it determines that the plurality of elapsed times are not substantially the same, it makes determination as NG (step S116). When time determination unit 309 determines that the pieces of data on an elapsed time do not have substantially the same value, it outputs determination as NG to registration unit 305.

Then, the process ends (return).

Figure 23:
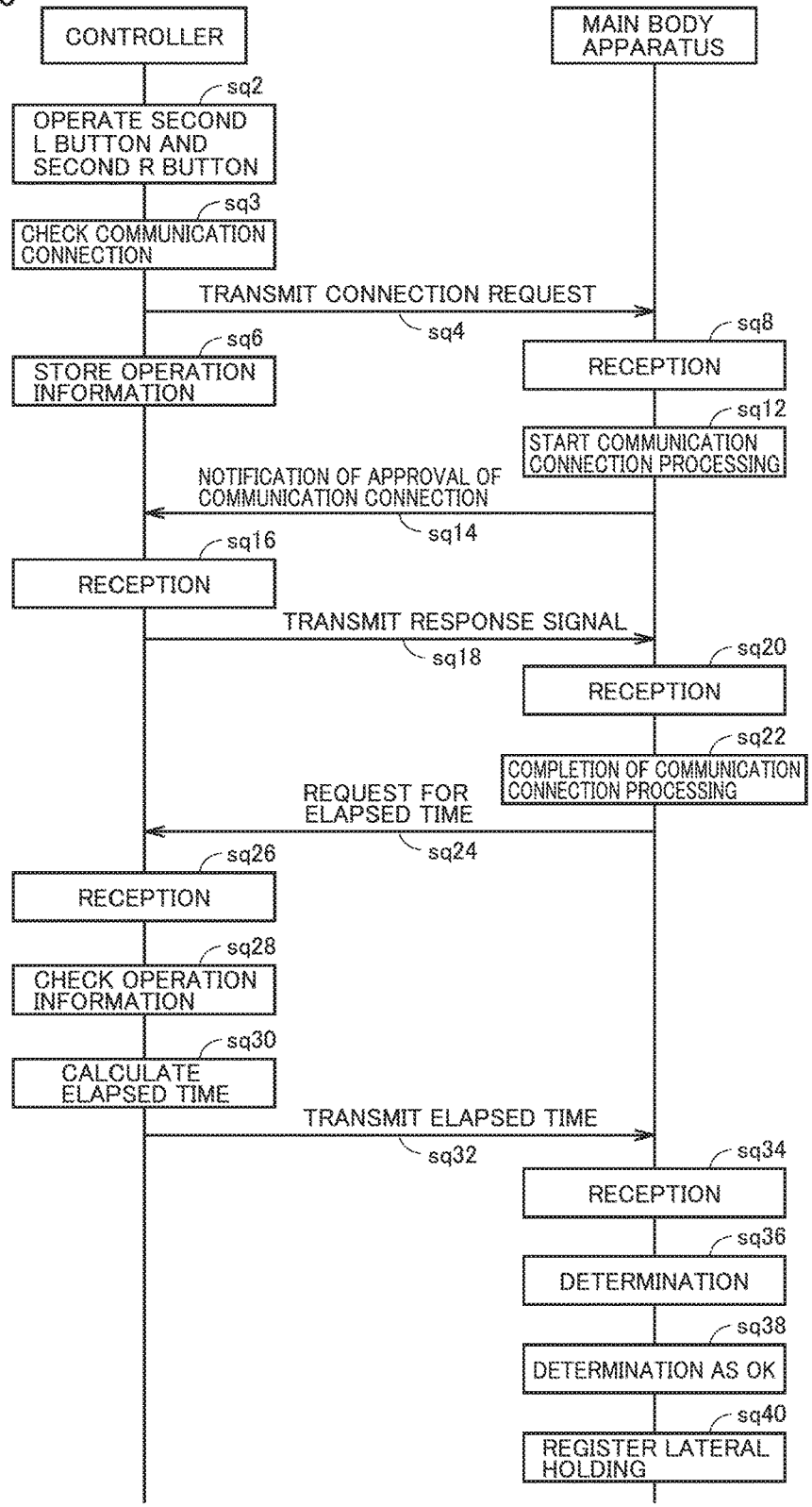
FIG. 23 is an example non-limiting sequence diagram illustrating transmission and reception of data between controller 3 and main body apparatus 2 based on the embodiment.

FIG. 23 is an example non-limiting sequence diagram illustrating transmission and reception of data between controller 3 and main body apparatus 2 based on the embodiment. In the present example, communication connection between controller 3 and main body apparatus 2 has not been established.

As shown in FIG. 23, a user operates second L button 43 and second R button 44 of controller 3 (sequence sq2).

Then, controller 3 checks whether or not communication connection has been established (sequence sq3). In the present example, communication connection has not been established.

Then, controller 3 transmits a connection request to main body apparatus 2 (sequence sq4).

Controller 3 has memory 102 store operation information (sequence sq6).

Main body apparatus 2 receives the connection request transmitted from controller 3 (sequence sq8).

Main body apparatus 2 starts processing for communication connection with controller 3 in response to the connection request (sequence sq12).

Main body apparatus 2 notifies controller 3 of approval for connection (sequence sq14).

Controller 3 receives the notification about approval for connection from main body apparatus 2 (sequence sq16).

Then, controller 3 transmits a response signal to main body apparatus 2 (sequence sq18).

Main body apparatus 2 receives the response signal from controller 3 (sequence sq20).

Processing for communication connection between controller 3 and main body apparatus 2 is thus completed (sequence sq22).

Then, main body apparatus 2 requests controller 3 with which communication connection has been established of transmission of an elapsed time relating to an operation time (sequence sq24).

Then, controller 3 receives the request for an elapsed time from main body apparatus 2 (sequence sq26).

Then, controller 3 checks operation information stored in memory 102 (sequence sq28).

Then, controller 3 calculates an elapsed time (sequence sq30).

Controller 3 transmits the elapsed time to main body apparatus 2 (sequence sq32).

Main body apparatus 2 receives the elapsed time transmitted from controller 3 (sequence sq34).

Main body apparatus 2 determines whether or not it has received a plurality of pieces of data on the elapsed time, and when it determines that it has received the plurality of pieces of data on the elapsed time, it determines whether or not the pieces of data on the elapsed time have substantially the same value (sequence sq36).

In the present example, main body apparatus 2 determines that the plurality of elapsed times are substantially the same and makes determination as OK (sequence sq38).

Main body apparatus 2 has the operation scheme in lateral holding registered in the registration information (sequence sq40).

Through the processing, in controller registration processing for a controller with which communication connection has not been established, by operating once a controller before communication connection therewith is established, an operation scheme can readily be registered based on information on an operation time along with communication connection processing, and hence usability can be improved.

In the present example, a scheme for controller 3 to calculate an elapsed time in response to a request for an elapsed time from main body apparatus 2 and to transmit the calculated elapsed time to main body apparatus 2 and for main body apparatus 2 to determine whether or not pieces of data on an elapsed time have substantially the same value has been described. Instead of controller 3 calculating an elapsed time, main body apparatus 2 may calculate an elapsed time. Specifically, controller 3 may transmit operation information (including an operation time) stored in memory 102 to main body apparatus 2 in response to a request and main body apparatus 2 may calculate an elapsed time and determine whether or not pieces of data on the elapsed time have substantially the same value.

Under the scheme above, the controller determines whether or not communication connection with main body apparatus 2 has been established, when communication connection has been established, it transmits operation data, and when communication connection has not been established, it transmits a connection request. Main body apparatus 2, however, may determine whether or not communication connection has been established. In this case, the controller constantly transmits operation data in response to an operation of an operation button. When communication connection has not been established, main body apparatus 2 may perform communication connection processing based on the operation data.

Controller registration processing can be performed based on operation data transmitted from each controller. In controller registration processing, one operation scheme can be registered based on contents in operation data for a controller for which selection from among a plurality of operation schemes can be made. Thus, controller registration processing in connection with an operation scheme can readily be performed and usability can be improved.

In the controller registration processing, an operation scheme once registered can also be changed.

For example, after the operation scheme in vertical holding in which two controllers are used is registered, change to the operation scheme in lateral holding in which one controller is used can also be made.

Specifically, both of the second L button and the second R button are pressed in left controller 3 of two controllers registered in association with player number P1. Through the processing, operation data is transmitted from the left controller to main body apparatus 2.

Main body apparatus 2 receives the operation data and performs processing for registering again a player and processing for registering lateral holding. The operation scheme of left controller 3 registered in association with player number P1 is changed to the operation scheme in lateral holding while the player number in the registration information is maintained. Information on allocation of the player number and the operation scheme in the registration information is deleted for right controller 4 registered in association with player number P1. Though description has been given for left controller 3, the description is also applicable to right controller 4, and processing for registering again of a player and for registering lateral holding is performed under a similar scheme.

After the operation scheme in lateral holding in which one controller is used is registered, change to the operation scheme in vertical holding in which two controllers are used can also be made.

Specifically, both of the first L button in left controller 3 registered in association with player number P3 and the first R button in right controller 4 registered in association with player number P4 are pressed. Through the processing, operation data is transmitted from left controller 3 and right controller 4 to main body apparatus 2.

Main body apparatus 2 receives the operation data and performs processing for registering again a player and processing for registering vertical holding under the scheme described above.

Left controller 3 registered in association with player number P3 and right controller 4 registered in association with player number P4 are determined as controllers constituting a set. The operation scheme of left controller 3 registered in association with player number P3 in the registration information is changed to the operation scheme in vertical holding while the player number is maintained. The player number of right controller 4 registered in association with player number P4 is changed to player number P3 and an operation scheme thereof is changed to the operation scheme in vertical holding.

[G. Game Processing]

Figure 24:
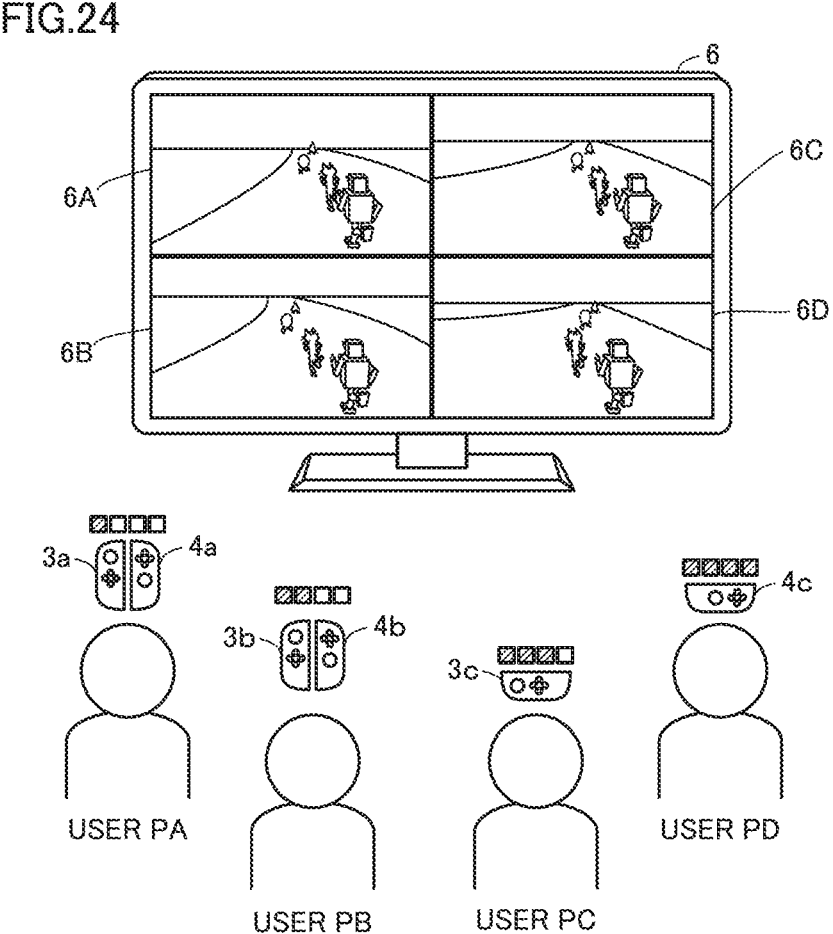
FIG. 24 is an example non-limiting diagram of one example illustrating game processing performed by game device 1 based on the embodiment.

FIG. 24 is an example non-limiting diagram of one example illustrating game processing performed by game device 1 based on the embodiment.

In FIG. 24, an image generated by game device 1 is shown on television 6.

In the present example, four players are shown. User PA operates a corresponding object with two controllers 3a and 4a. User PB operates a corresponding object with two controllers 3b and 4b. User PC operates a corresponding object with one controller 3c. User PD operates a corresponding object with one controller 4c.

In the present example, game device 1 divides a display area of television 6 into four sections, and shows an image for user PA (for example, an image including the first object) in a divided display area 6A and an image for user PB (for example, an image including the second object) in a divided display area 6B. Similarly, game device 1 shows an image for user PC (for example, an image including a third object) in a divided display area 6C and an image for user PD (for example, an image including a fourth object) in a divided display area 6D.

Each controller controls a notification LED based on a player number from game device 1.

In the present example, users PA to PD representing four players operate corresponding objects with the controllers, respectively. This is also applicable to an example in which there is one player.

[H. Processing Procedure]

A processing procedure involved with game processing in game device 1 based on the embodiment will now be described.

Figure 25:
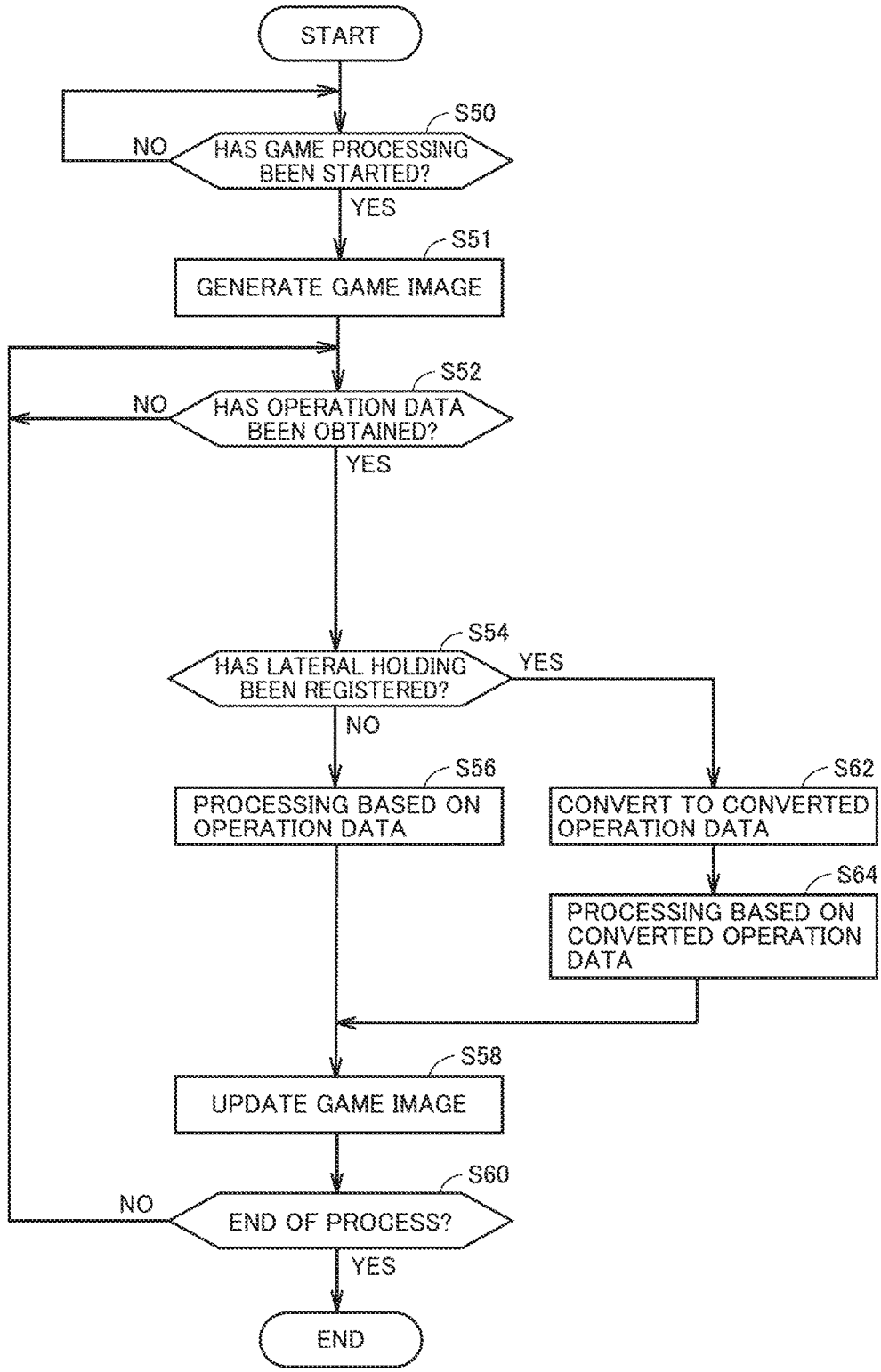
FIG. 25 is an example non-limiting flowchart showing a processing procedure involved with the game processing based on the embodiment.

FIG. 25 is an example non-limiting flowchart showing a processing procedure involved with the game processing based on the embodiment.

Each step shown in FIG. 25 is typically performed by execution of a program by CPU 81 of main body apparatus 2.

Referring to FIG. 25, CPU 81 determines whether or not start of game processing has been indicated (step S50). Game processing execution module 302 determines whether or not start of game processing has been indicated.

When CPU 81 determines that start of game processing has been indicated (YES in step S50), it generates a game image in which an object is arranged in a game space (step S51). Game processing execution module 302 generates a game image in which an object is arranged in a game space based on a program saved and executed in DRAM 85.

Then, CPU 81 determines whether or not it has obtained operation data (step S52). Specifically, game processing execution module 302 determines whether or not operation data has been obtained through communication control module 310.

When CPU 81 determines in step S52 that it has obtained operation data (YES in step S52), it determines whether or not an operation in lateral holding has been registered (step S54). Specifically, game processing execution module 302 determines whether or not the operation scheme in lateral holding has been registered in the information on the operation scheme in the registration information for a controller corresponding to the obtained operation data, by referring to the registration information stored in flash memory 84.

When CPU 81 determines in step S54 that the operation in lateral holding has not been registered (NO in step S54), it performs processing based on the operation data (step S56). Specifically, when game processing execution module 302 determines that the operation scheme in lateral holding has not been registered in the information on the operation scheme in the registration information for the controller corresponding to the obtained operation data by referring to the registration information stored in flash memory 84, it performs game processing based on the obtained operation data.

Then, CPU 81 updates the game image (step S58). Specifically, game processing execution module 302 generates a game image in accordance with the operation data in accordance with an obtained operation by a user. Then, updated output is given to television 6 in accordance with the generated game image.

Then, CPU 81 determines whether or not end of game processing has been indicated (step S60).

When CPU 81 determines in step S60 that end of game processing has been indicated (YES in step S60), the process ends (end).

When CPU 81 determines in step S60 that end of game processing has not been indicated (NO in step S60), the process returns to step S52 and the process is repeated.

When CPU 81 determines in step S54 that the operation in lateral holding has been registered (YES in step S54), it performs processing for converting operation data into converted operation data (step S62). Specifically, when game processing execution module 302 determines that the operation scheme in lateral holding has been registered in the information on the operation scheme in the registration information for the controller corresponding to the obtained operation data by referring to the registration information stored in flash memory 84, it performs processing for converting the operation data into converted operation data.

Specifically, in the case of left controller 3, conversion to such converted operation data that a direction instruction from analog stick 32 is rotated counterclockwise by 90° is made.

Thus, an instruction from left controller 3 operated as being laterally held onto an object can be the same in direction as a direction instruction from analog stick 32 of left controller 3 operated as being vertically held. Functions of four operation buttons 33 to 36 are allocated to the X button, the A button, the Y button, and the B button, respectively. Thus, the operation buttons in left controller 3 operated as being laterally held for an object can be the same in function as four operation buttons 33 to 36 under the operation scheme in vertical holding.

In the case of right controller 4, conversion to such converted operation data that a direction instruction from analog stick 52 is rotated clockwise by 90° is made.

Thus, an instruction from right controller 4 operated as being laterally held onto an object can be the same in direction as a direction instruction from analog stick 52 of right controller 4 operated as being vertically held. Functions of four operation buttons 53 to 56 are allocated to the B button, the Y button, the A button, and the X button, respectively. Thus, the operation buttons in right controller 4 operated as being laterally held for an object can be the same in function as four operation buttons 53 to 56 under the operation scheme in vertical holding.

Then, CPU 81 performs processing based on the converted operation data (step S64). Specifically, game processing execution module 302 generates a game image in accordance with the converted operation data. Then, updated output is given to television 6 in accordance with the generated game image.

Since subsequent processing is similar, detailed description thereof will not be repeated.

Then, CPU 81 updates the game image (step S58). Specifically, game processing execution module 302 generates a game image in accordance with operation data in accordance with an obtained operation by a user. Then, updated output is given to television 6 in accordance with the generated game image.

Since subsequent processing is similar, detailed description thereof will not be repeated.

An application executable on a personal computer may be provided as a program in the present embodiment. The program according to the present embodiment may be incorporated as some functions of various application programs executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A game system comprising:
a game controller; and
a main body apparatus,
the game controller having
a first operation member,
a second operation member,
a memory storing a first operation time at which the operation onto the first operation member has been performed and a second operation time at which the operation onto the second operation member has been performed, and
a first control circuit transmitting to the main body apparatus, a connection signal in accordance with at least any of an operation onto the first operation member and an operation onto the second operation member,
the main body apparatus having
a second control circuit, wherein
the second control circuit
performs processing for establishing connection with the game controller in accordance with the connection signal, and
transmits to the game controller, a request signal requesting for information on the first operation time and the second operation time stored in the memory when the processing for establishing connection is completed,
the first control circuit of the game controller transmits the information on the first operation time and the second operation time stored in the memory to the main body apparatus in response to the request signal, and
the second control circuit of the main body apparatus
determines whether the operation onto the first operation member and the operation onto the second operation member satisfy a predetermined condition based on the information on the first operation time and the second operation time, and
registers a first operation scheme as an operation scheme of the game controller when a result of determination is affirmative.

2. The game system according to claim 1, wherein
the second control circuit determines whether the operation onto the first operation member and the operation onto the second operation member have been performed substantially simultaneously based on the information on the first operation time and the second operation time.

3. The game system according to claim 1, wherein
the second control circuit performs game processing based on at least any of a first operation signal in accordance with the operation onto the first operation member and a second operation signal in accordance with the operation onto the second operation member.

4. The game system according to claim 1, wherein
the second control circuit registers the first operation scheme among a plurality of operation schemes as the operation scheme of the game controller when the result of determination is affirmative.

5. The game system according to claim 1, wherein
the first and second operation members are on a side of a predetermined operation surface of a housing of the game controller when a user performs an operation.

6. The game system according to claim 1, wherein
the second control circuit registers, when a result of determination is negative, the first operation scheme as the operation scheme of the game controller based on a first operation signal in accordance with the operation onto the first operation member and a second operation signal in accordance with the operation onto the second operation member which are subsequently received.

7. The game system according to claim 1, wherein
the game controller further includes a third operation member,
the first control circuit transmits to the main body apparatus, a third operation signal in accordance with an operation onto the third operation member, and
the second control circuit registers, when a result of determination is negative, a second operation scheme different from the first operation scheme as the operation scheme of the game controller based on the third operation signal which is subsequently received.

8. A game controller which can communicate with a main body apparatus comprising:
a first operation member;
a second operation member;
a memory storing a first operation time at which the operation onto the first operation member has been performed and a second operation time at which the operation onto the second operation member has been performed; and
a control circuit; wherein the control circuit
starts processing for establishing connection with the main body apparatus by transmitting to the main body apparatus, a connection signal in accordance with at least any of an operation onto the first operation member and an operation onto the second operation member,
receives a request signal indicating a request for a first elapsed time since the operation onto the first operation member and a second elapsed time since the operation onto the second operation member from the main body apparatus with which the processing for establishing connection has been completed, in order for the main body apparatus to detect simultaneous pressing of the first operation member and the second operation member,
transmits to the main body apparatus, in response to the request signal, the first elapsed time based on a current time and the first operation time stored in the memory and the second elapsed time based on the current time and the second operation time stored in the memory, and
transmits to the main body apparatus, a first operation signal in accordance with the operation onto the first operation member and a second operation signal in accordance with the operation onto the second operation member for game processing in the main body apparatus.

9. The game controller according to claim 8, wherein the first and second operation members are provided on a side of a predetermined operation surface of a housing of the game controller when a user performs an operation.

10. A game system comprising:
a game controller; and
a main body apparatus,
the game controller having
   a first operation member,
   a second operation member,
   a memory storing a first operation time at which an operation onto the first operation member has been performed and a second operation time at which an operation onto the second operation member has been performed when the operation onto the first operation member and the operation onto the second operation member have been performed while connection with the main body apparatus has not been established, and
   a first control circuit transmitting to the main body apparatus, a connection signal for connection with the main body apparatus while connection with the main body apparatus has not been established,
the main body apparatus having
   a second control circuit, wherein
the second control circuit
   performs processing for establishing connection with the game controller in accordance with the connection signal, and
   transmits to the game controller, a request signal requesting for information on the first operation time and the second operation time stored in the memory when the processing for establishing connection is completed,
the first control circuit of the game controller transmits the information on the first operation time and the second operation time stored in the memory to the main body apparatus in response to the request signal, and
the second control circuit of the main body apparatus
   determines whether the operation onto the first operation member and the operation onto the second operation member satisfy a predetermined condition based on the information on the first operation time and the second operation time, and
   registers a first operation scheme as an operation scheme of the game controller when a result of determination is affirmative.

* * * * *